United States Patent [19]
Gamo et al.

[11] Patent Number: 5,976,725
[45] Date of Patent: Nov. 2, 1999

[54] FUEL CELL SYSTEM, FUEL FEED SYSTEM FOR FUEL CELL AND PORTABLE ELECTRIC APPLIANCE

[75] Inventors: Takaharu Gamo, Fujiidera; So Kuranaka, Osaka; Yoshio Morita, Suita; Jo Suzuki, Tokyo; Mamoru Hamanishi, Tokyo; Sadao Nagai, Tokyo; Kazuhito Hatoh, Daito; Eiichi Yasumoto, Katano, all of Japan

[73] Assignee: Matsushita Electric Industrial Co., Ltd., Kadoma, Japan

[21] Appl. No.: 08/876,439

[22] Filed: Jun. 16, 1997

[30] Foreign Application Priority Data

Jun. 14, 1996 [JP] Japan .................................. 8-153651
Aug. 14, 1996 [JP] Japan .................................. 8-214408
Oct. 24, 1996 [JP] Japan .................................. 8-281188

[51] Int. Cl.$^6$ ........................................................ H01M 8/04
[52] U.S. Cl. .............................. 429/25; 429/19; 429/20; 429/24; 429/33; 429/34; 429/35
[58] Field of Search ............................... 429/17, 19, 20, 429/24, 25, 33, 35, 34

[56] References Cited

U.S. PATENT DOCUMENTS 5,250,368 10/1993 Golben et al. ............................. 429/17
5,306,577 4/1994 Sprouse ..................................... 429/17
5,314,762 5/1994 Hamada et al. .......................... 429/37

FOREIGN PATENT DOCUMENTS

| 4-181659 | 6/1992 | Japan . |
| 6-60894 | 3/1994 | Japan . |
| 6-76848 | 3/1994 | Japan . |
| 6-150955 | 5/1994 | Japan . |
| 8-115731 | 5/1996 | Japan . |

*Primary Examiner*—Bruce F. Bell
*Attorney, Agent, or Firm*—Smith, Gambrell & Russell; Beveridge, DeGrandi, Weilacher & Young Intellectual Property Group

[57] ABSTRACT

A fuel cell system has a fuel cell of solid polymer type, a rectangular parallelepiped sealing container for accommodating hydrogen occlusion alloy for occluding hydrogen to be supplied to said fuel cell, a connection portion provided in a hydrogen passage between said sealing container and said fuel cell for connecting said sealing container and said fuel cell detachably, a valve mechanism provided in said hydrogen passage for opening and shutting hydrogen gas, and a hydrogen flow rate control mechanism provided in said hydrogen passage for controlling the flow rate of hydrogen gas, and/or hydrogen pressure control mechanism for controlling the pressure of hydrogen gas.

29 Claims, 21 Drawing Sheets

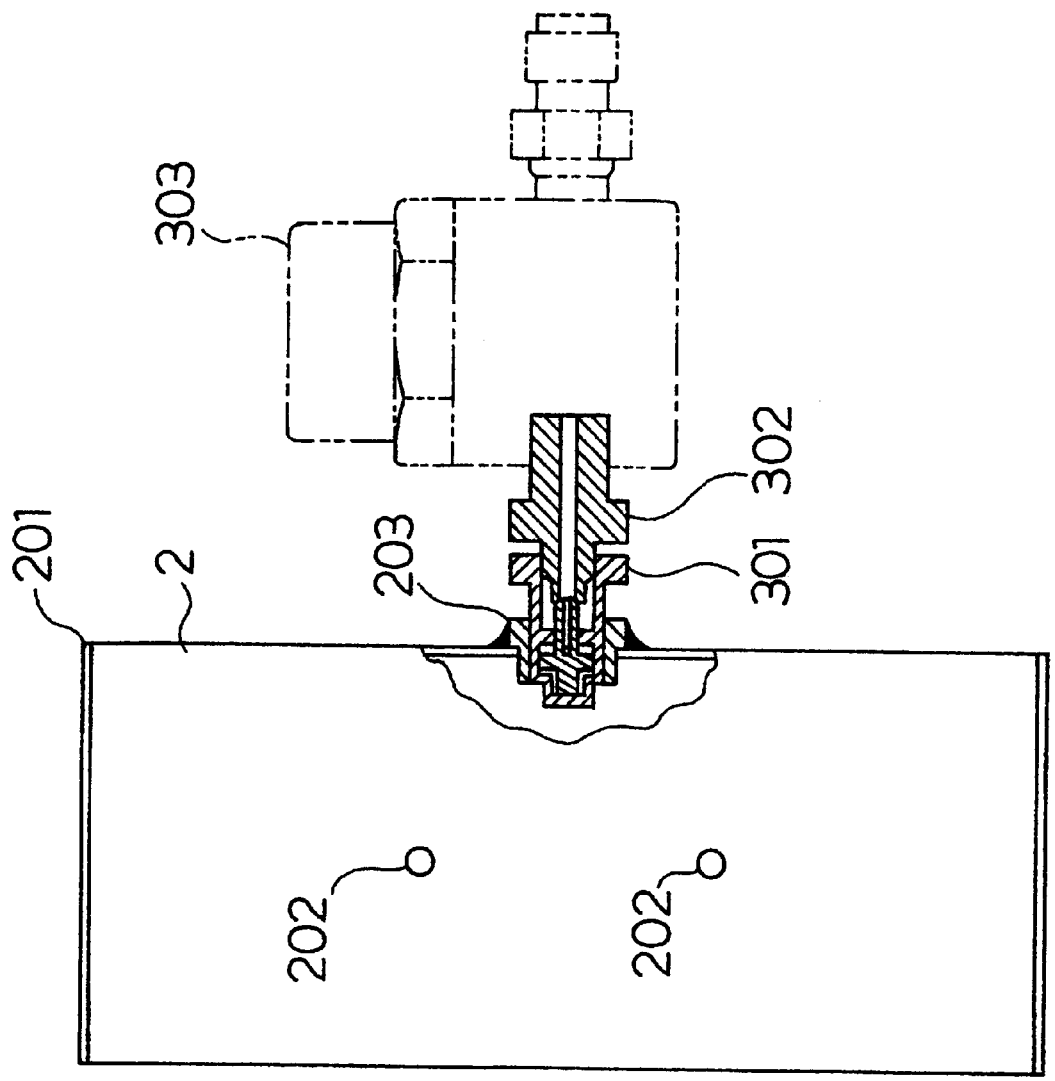

Press forming

FUEL CELL SYSTEM, FUEL FEED SYSTEM FOR FUEL CELL AND PORTABLE ELECTRIC APPLIANCE

BACKGROUND OF THE INVENTION

1. Field of the Invention

The present invention relates to a small-sized fuel cell system, fuel feed system employed in a polyelectrolyte type fuel cell usable as a power supply for portable electric appliance such as an office automation appliance, in particular, and also to a portable electric appliance.

2. Related Art of the Invention

Generally, a fuel cell induces a chemical reaction between fuel such as hydrogen and oxygen to convert chemical energy directly into electric energy, and therefore a high power generation efficiency is obtained, the noise is very low, and the size can be reduced because there are few mechanical driving parts. Such a fuel cell is relatively easy in installation and management, and is hence used in distributed power supply system, power supply for communication equipment, etc. Recently, a fuel cell system combining fuel cell and hydrogen occlusion alloy has been used as a portable power supply, and various structures have been proposed for such fuel cell system (Japanese Laid-open Patents 6-76848, 6-60894, etc.).

As the fuel, liquid fuel such as methanol, or gas fuel such as natural gas or hydrogen is mainly used, and lately, in particular, as the fuel for small-sized power supply, hydrogen contained in a cylinder filled together with hydrogen occlusion alloy is used because it is relatively easy in handling. For example, in the constitution proposed in Japanese Laid-open Patent 6-150955, a cylinder filled with hydrogen occlusion alloy for feeding hydrogen to the fuel cell is contained in a portable casing independently of the power supply main body containing the fuel cell, and this casing is provided with an exhaust gas inlet for allowing the exhaust gas generated from the fuel cell to pass through the cylinder. In this constitution, since the casing is portable independently of the power supply main body, the casing can be increased in size without space restrictions for containing the cylinder. Moreover, the cylinder temperature and pressure can be elevated by the exhaust gas from the fuel cell, so that the hydrogen can be supplied smoothly.

Moreover, as disclosed in Japanese Laid-open Patent 4-181659, for example, in order to heighten the safety of the fuel cell system, a fuel cell system is proposed, in which the hydrogen equilibrium pressure at the upper limit of the plateau region of hydrogen occlusion alloy as hydrogen storage means is 10 atm or less at ordinary pressure.

On the other hand, portable electronic devices such as laptop computers are extremely reduced in size and weight and enhanced in performance, and as the secondary cells used as power source, high performance cells such as nickel and hydrogen storage battery and lithium ion secondary cells have come to be used from the viewpoint of longer time of use, smaller size and lighter weight.

In the conventional secondary cells, it is difficult to extend the operating time and reduce the size and weight further. Accordingly, it is considered to use the fuel cell in the power source of portable electronic device. In the case of the cylinder filled with such hydrogen occlusion alloy, using hydrogen as fuel, however, the cylinder is required to have a high pressure resistance, and is hence formed in a cylindrical shape, which produces a dead space, and it is disadvantageous for obtaining a long operating time, smaller size and lighter weight.

SUMMARY OF THE INVENTION

In the light of the problems of such conventional fuel cells, it is hence an object of the invention to present a fuel cell system, a fuel feed system for fuel cell capable of using for a long time, and reduced in size and weight, and a portable electric apparatus.

A fuel cell system of the present invention comprises a fuel cell of solid polymer type, a rectangular parallelepiped sealing container for accommodating hydrogen occlusion alloy for occluding hydrogen to be supplied to said fuel cell, a connection portion provided in a hydrogen passage between said sealing container and said fuel cell for connecting said sealing container and said fuel cell detachably, a valve mechanism provided in said hydrogen passage for opening and shutting hydrogen gas, and a hydrogen flow rate control mechanism provided in said hydrogen passage for controlling the flow rate of hydrogen gas, and/or hydrogen pressure control mechanism for controlling the pressure of hydrogen gas.

BRIEF DESCRIPTION OF THE DRAWINGS

FIG. 3 is a partial sectional view showing a connection portion mounted on the hydrogen occlusion alloy container in the same embodiment.

DESCRIPTION OF REFERENCE NUMERALS

Figure 1:
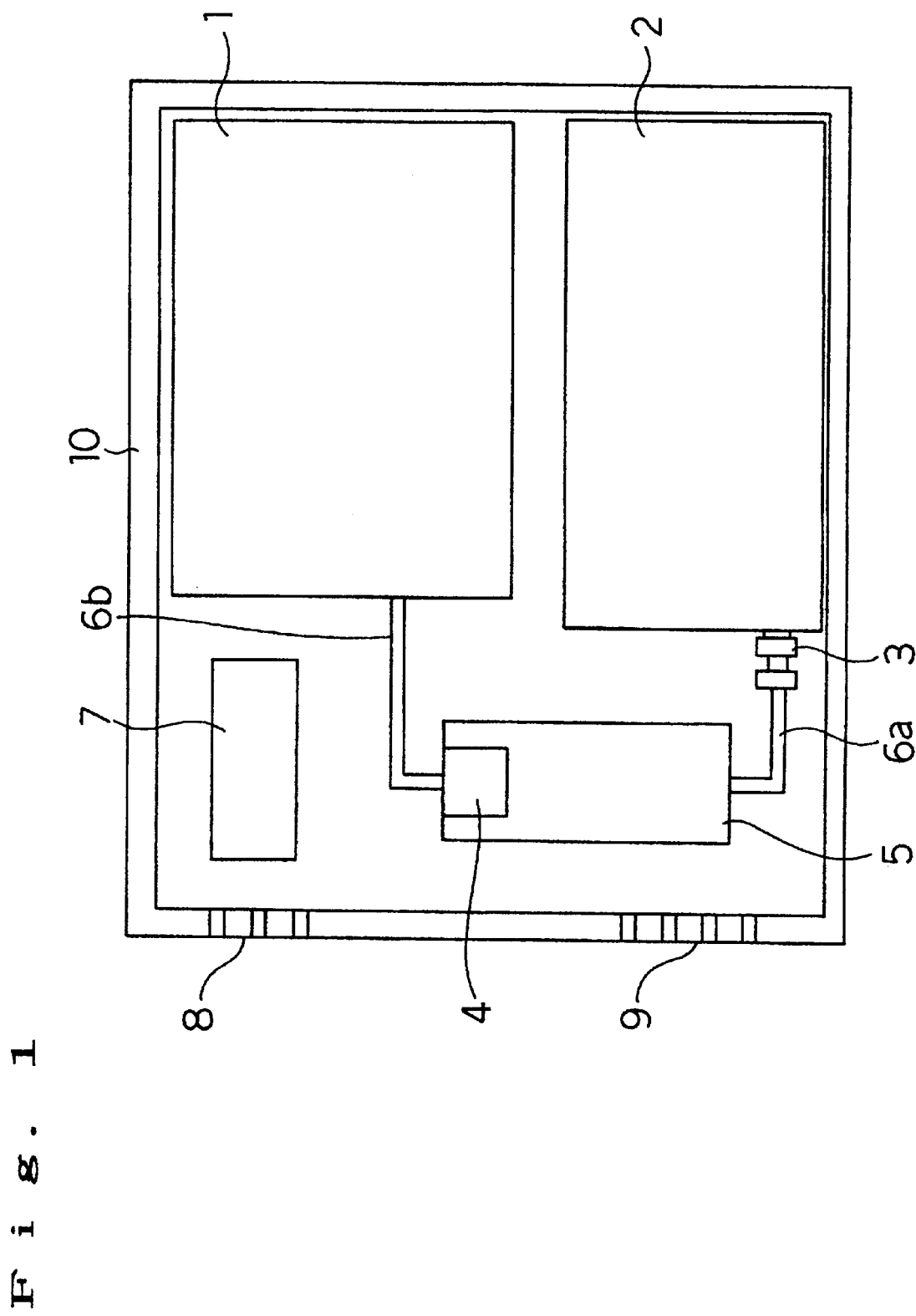
FIG. 1 is a block diagram of a portable battery pack using a hydrogen feed system for fuel cell system in an embodiment of the invention.

1 Polyelectrolyte type fuel cell main body
2 Hydrogen occlusion alloy container (a sealing container for feeding fuel to fuel cell)
3 Connection portion
4 Mini valve
5 Pressure regulator
6a Fuel passage
6b Fuel passage
7 Fan
8 Intake port
9 Exhaust port
10 Casing
111 Substance which generates hydrogen by reacting with water or acidic aqueous solution
112 Water or acidic aqueous solution
113 Partition
114 Sealing container for feeding fuel to fuel cell
115 Switch
116 Fuel feed port
117 Hydrophilic nonwoven cloth
202 Stay (support member)
205 Gap
301, 602 Valve main body
302, 601 Push metal
402, 608 Spring
403, 604 Core
406, 606 Core packing
500 fuel cell system
501 note type personal computer
505 container of fuel feed system for fuel cell (hydrogen occlusion alloy container)
701 Wick
703 Filter
705 Push joint
803, 1201 Piston
902 Handle
903 opening indicator
1202 Valve seat
1303 Fixed stem
1304 opening stem
1305 Lever

DESCRIPTION OF THE PREFERRED EMBODIMENTS

Referring now to the drawings, preferred embodiments of the invention are described below.

FIG. 1 is a block diagram of a portable battery pack using a fuel cell system in an embodiment of the invention. In FIG. 1, the fuel cell system of the embodiment is composed of a polyelectrolyte type fuel cell main body 1 for generating electric energy by chemical reaction between hydrogen of fuel and oxygen of oxidizing agent, a hydrogen occlusion alloy container 2 as a sealing container containing hydrogen occlusion alloy for storing hydrogen of fuel, a connection portion 3 attached to the hydrogen occlusion alloy container 2, a piping 6a connected to the connection portion 3, a pressure regulator 5 as a hydrogen pressure control mechanism connected to the piping 6a, a valve mechanism 4 connected to the pressure regulator, and a piping 6b connected to the valve mechanism 4, and the other end of the piping 6b is connected to the polyelectrolyte type fuel cell main body 1. Herein, the connection portion 3, piping 6a, pressure regulator 5, valve mechanism 4, and piping 6b compose a hydrogen passage. Moreover, as mentioned below, the connection portion 3 has a structure for detaching the hydrogen occlusion alloy container 2 from the piping 6a, that is, from the fuel cell 1, so that the hydrogen may be refilled or the hydrogen occlusion alloy container 2 may be replaced easily.

Although not shown in the drawing, since the ion conductivity is lowered and the characteristic of the fuel cell deteriorates when the electrolyte membrane in the fuel cell 1 is dried, a humidifier is installed in the hydrogen passage in order to prevent drying of the electrolyte membrane.

Further, in order to have a heat exchange function between the fuel cell 1 and hydrogen occlusion alloy container 2, for example, one copper plate is put in contact to cover both upper surfaces of the fuel cell 1 and hydrogen occlusion alloy container 2. In this way, the heat generated in the fuel cell 1 is transmitted to the hydrogen occlusion alloy container 2, and the temperature and pressure in the container are elevated, so that hydrogen may be supplied smoothly into the fuel cell 1.

Thus composed fuel cell system is put in a casing 10 having an intake port 8 for sucking in fresh air and an exhaust port 9 for discharging exhaust gas, and a fan 7 is provided in the casing 10 so as to feed efficiently the air as the oxidizing agent to the oxygen electrode in the fuel cell 1, thereby composing a small-sized portable battery pack. This casing 10 should be preferably made of material high in heat insulation and excellent in heat resistance, such as plastics, so that the heat of the fuel cell 1 may not have adverse effects on the outside. The air getting in through the intake port 8 by the fan 7 passes near the fuel cell 1 and near the hydrogen occlusion alloy container 2, and goes out through the exhaust port 9, and by this circulation of air in the casing 10, the air warmed by passing near the fuel cell 1 passes near the hydrogen occlusion alloy container 2 and warms it, thereby presenting an auxiliary effect for heat exchange.

Figure 2A:
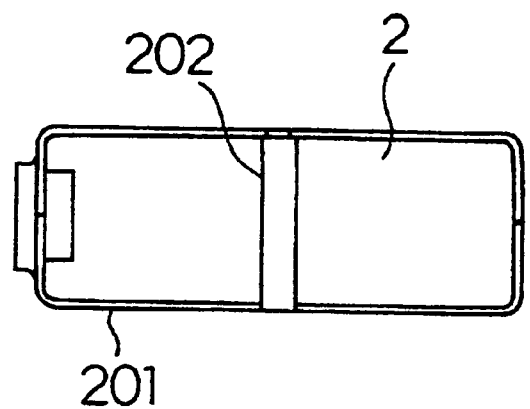
FIG. 2 (A) is a longitudinal sectional view of a hydrogen occlusion metal container in the same embodiment, and FIG. 2 (B) is its cross sectional view.
Figure 2B:
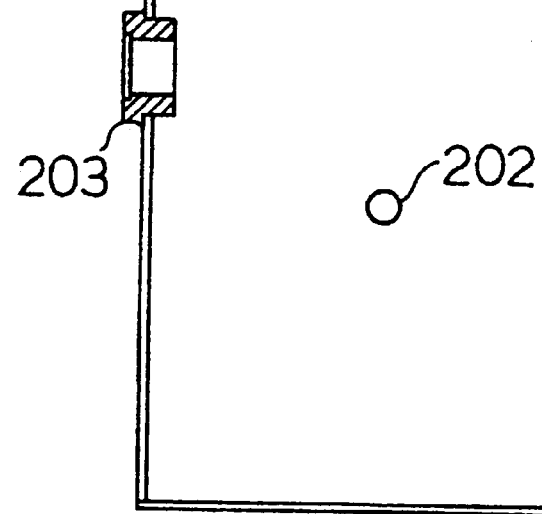

FIGS. 2(*a*) and 2(*b*) show a longitudinal sectional view and a cross sectional view of the hydrogen occlusion alloy container 2 of the invention. The hydrogen occlusion alloy container 2 is composed of a hollow rectangular parallelepiped container main body 201, a stay 202 as support member provided inside the container main body 201, and a valve mounting seat 203 affixed at the inlet and outlet of hydrogen for mounting the connection portion 3, and later the inside of the container main body 201 is filled with hydrogen occlusion alloy powder.

Explained below is an example of a manner of determining the size of the container main body 201. Using $AB_2$ type Laves alloy as hydrogen occlusion alloy, and supposing the hydrogen occlusion amount to e 1.7 mass %, 40 liters/1 container, hydrogen pressure to be about 0.3 MPa at 25° C., normal pressure to be <1.0 MPa, hydrogen generation amount to be 222 cc/min, alloy specific gravity to be 6.5, and alloy filling rate to be 55%, the amount of alloy necessary for hydrogen occlusion of 40 liters is, assuming the volume of 1 mol of water at 25° C. to be 24.45 liters, molar number of hydrogen=40/24.45=1.636 (mols), and weight of hydrogen= 1.636×2=3.272 g.

Therefore, weight of alloy=3.272/0.017=192.5 g, that is, about 200 g.

Hence, the inner volume X of the container necessary for occluding 40 liters of hydrogen is X=200/(0.55×6.5)=56 cc. In this case, for example, the inner dimensions of the container may be 5 cm×7 cm×1.6 cm, which amounts to 56 cc. Herein, the $AB_2$ type Ti(Zr)-Mn system alloy hydrogen occlusion alloy can change the hydrogen equilibrium pressure continuously depending on the composition (mainly Ti/Zr ratio), and hence it may be controlled under 10 kg/cm² g or less depending on the operating temperature, and by selecting the optimum hydrogen occlusion alloy, the safety of the fuel cell system may be enhanced while feeding hydrogen smoothly.

Figure 11:
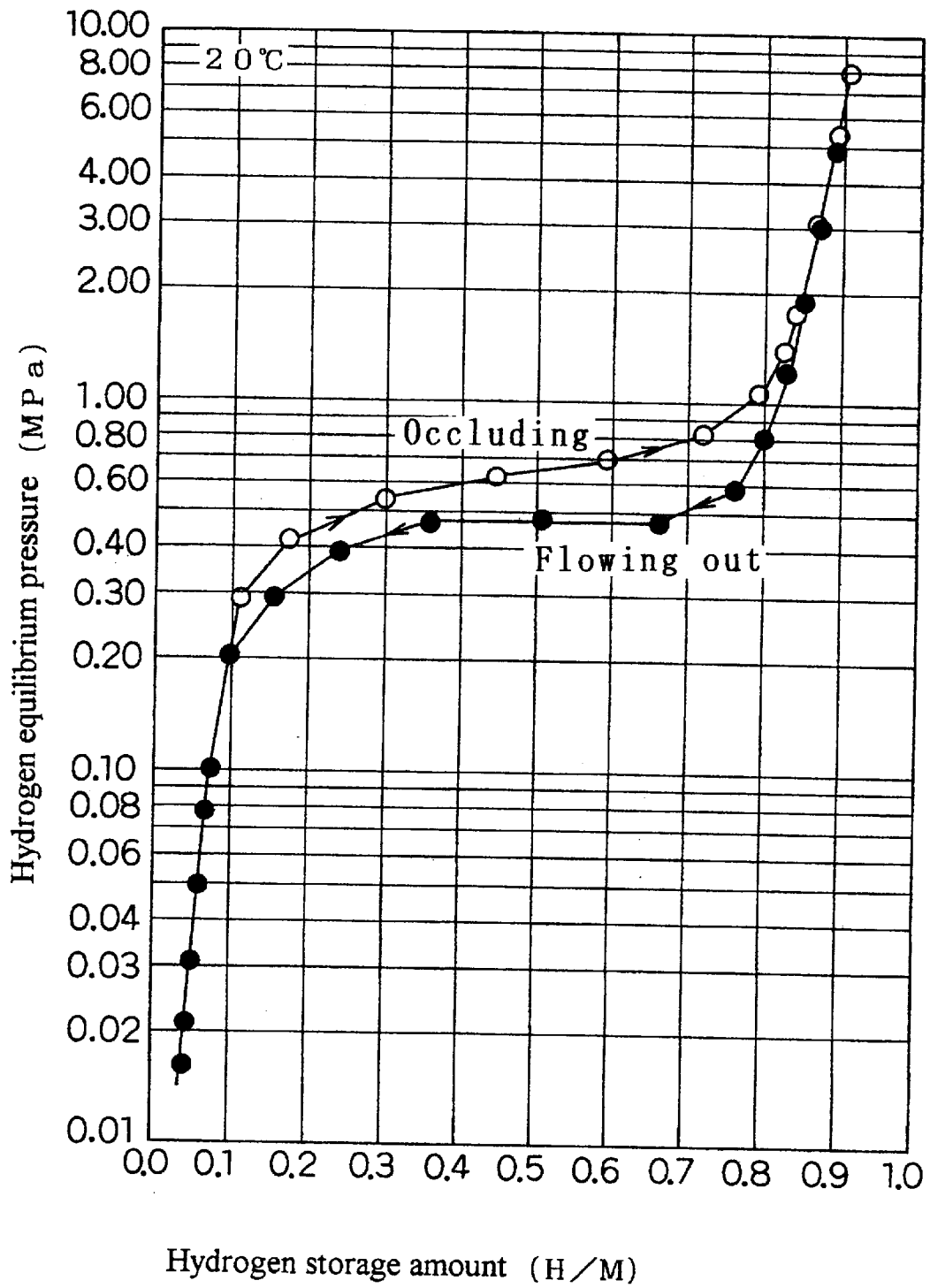
FIG. 11 is a diagram showing the relation between hydrogen equilibrium pressure and hydrogen storage amount of hydrogen occlusion alloy in $AB_2$ type Laves alloy.
Figure 12:
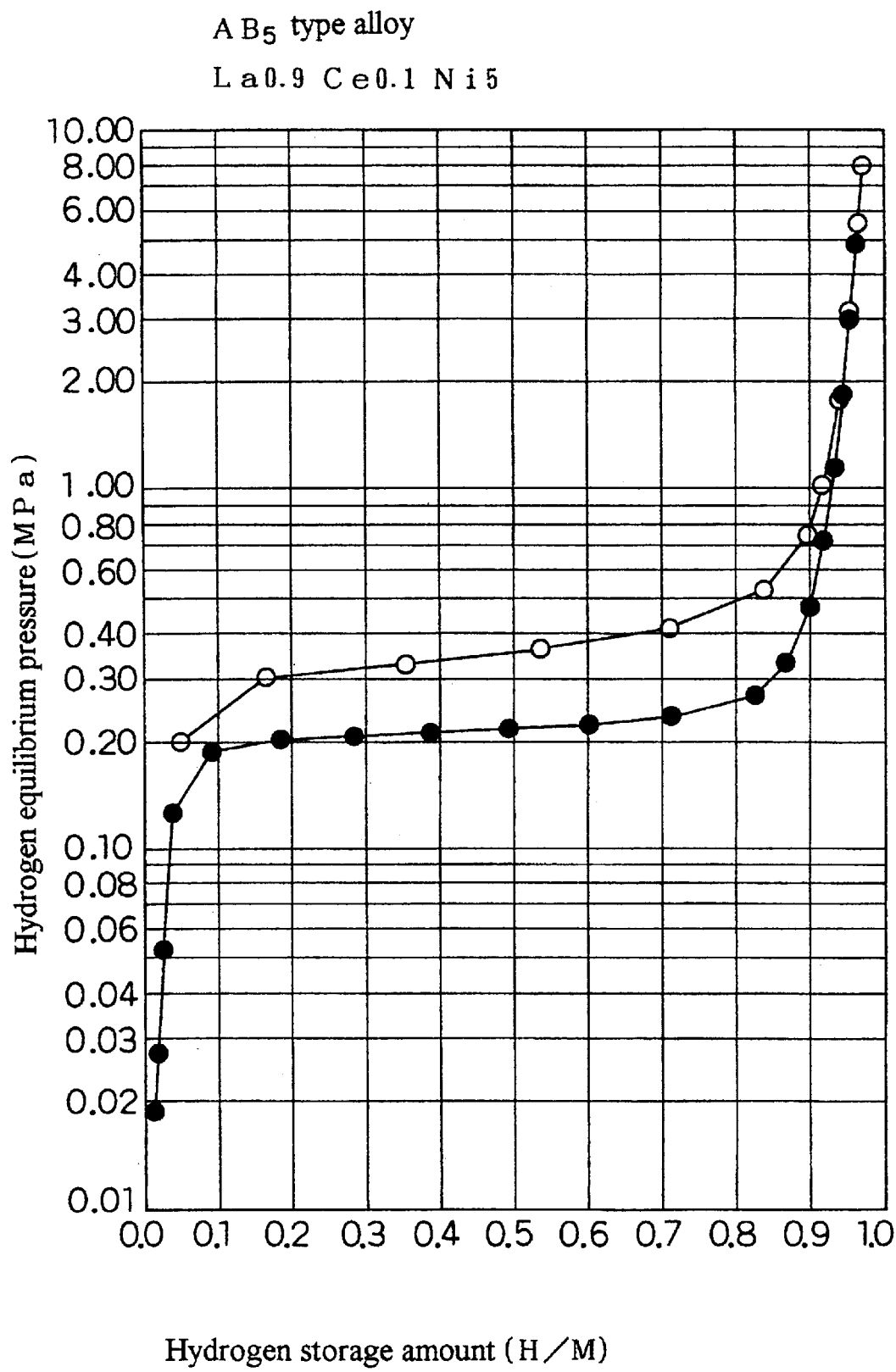
FIG. 12 is a diagram showing the relation between hydrogen equilibrium pressure and hydrogen storage amount of hydrogen occlusion alloy in hexagonal system $AB_5$ type alloy.

In the above description, the $AB_2$ type Laves alloy is presented as an example of hydrogen occlusion alloy, but hexagonal system $AB_5$ type alloy or other hydrogen occlusion alloys may be also employed. The relation between the hydrogen equilibrium pressure and hydrogen occlusion amount in the $AB_2$ type Laves alloy is shown in FIG. 11, and the relation between the hydrogen equilibrium pressure and hydrogen occlusion amount in the hexagonal system $AB_5$ type alloy is shown in FIG. 12. FIG. 11 and FIG. 12 are graphs showing the relation between the hydrogen equilibrium pressure and hydrogen occlusion amount at a certain temperature, generally known as PCT diagram. The hydrogen equilibrium pressure of hydrogen occlusion alloy is preferred to be 1.1 MPa or less at 35° C. The reason is that High Pressure Gas Control Law requires the limit pressure of a movable gas pressure container should be 10 kg/cm² g at 35° C. during use (when releasing gas), and within the normal operating temperature range (that is, 0° C. to 45° C.), the pressure is abnormally high at 45° C., and leak occurs in the fuel cell, and the fuel cell utility efficiency drops. It is also possible that the cell casing may be broken. Therefore, it is appropriate at atmospheric pressure or higher at normal operating temperature at 35° C. and 1.1 MPa or less.

As the material for the container main body 201, cupriferous metal, ferriferous alloy, aluminiferous metal, stainless steel or others may be used, and from the viewpoint of durability, stainless steel is preferred, from the viewpoint of cost and strength, ferriferous alloy is preferred, from the viewpoint of thermal conductivity and welding performance, cupriferous metal is preferred, and from the viewpoint of reduction of weight, aluminiferous metal is preferred. Incidentally, the stay 202 is intended to compensate for shortage of pressure-proof strength because of the rectangular parallelepiped shape of the container, and it is installed in the weakest direction of pressure-proof strength, that is, in the direction of shortest length of dimension of rectangular parallelepiped (the surfaces of the largest area). By this rectangular parallelepiped shape, the cylinder has almost no dead space, and can be reduced in size. In the example in FIG. 2(*b*), two stays 202 are used, but the number may be arbitrary as far as the pressure-proof strength of the container main body 201 may be sufficient. Alternatively, if the sectional shape of the container is square columnar and the pressure-proof strength, no particular stay is needed. The valve mounting seat 203 is affixed by fitting and welding into a circular hole formed at the side of the container main body 201. For this welding and welding of container main body 201, for example, TIG welding, argon welding, or brazing welding may be employed.

Figure 4:
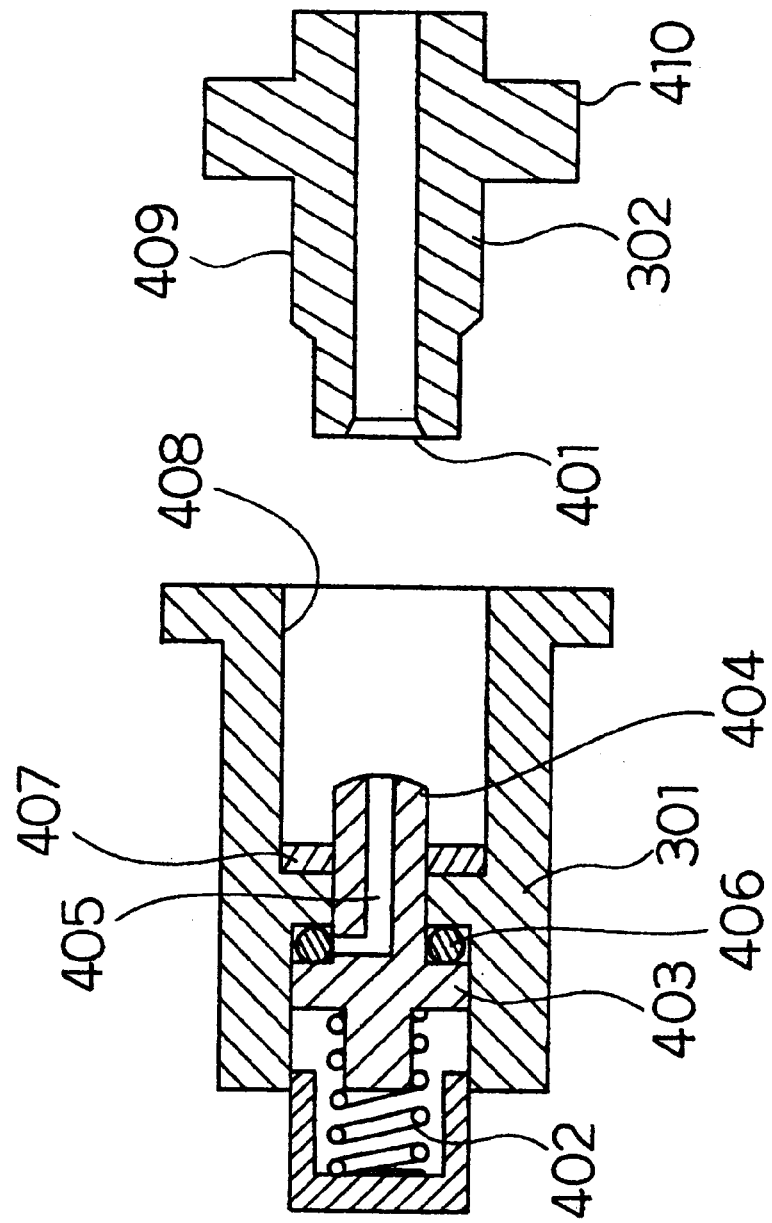
FIG. 4 is a sectional view for explaining the function of the connection portion.

FIG. 3 is a partial sectional view shown a core valve connector is attached as a connection portion to the valve mounting seat 203 of the container main body 201. This core valve connector forms a set by a valve main body 301 at the container main body 201 side and a push metal 302 at the pressure reducing valve (pressure regulator) 303 side. The detail of the core valve connector is shown in FIG. 4. In FIG. 4, the valve main body 301 is tubular in shape with a different inside diameter, and has a threaded groove 408 provided inside of the connection port side, and is composed of a core 403 slidable inside of the valve main body, a spring 402 for thrusting the core 403 to the connection port side, a core packing 406 for closing a hole 405 to stop hydrogen release from the hydrogen occlusion alloy container 2 when the core 403 is thrust by the spring 402, and a sheet packing 407 for preventing external release of hydrogen when the push metal 302 is connected. In the push metal 302, the end portion 401 at the hole connection side is in a tapered tubular form, and a nut 410 and a threaded groove 409 are formed at the outside.

Supposing to connect the hydrogen occlusion alloy container 2 and the fuel cell side, when the push metal 302 is gradually driven into the valve main body 301, the leading end 401 of the push metal 302 hits against the end portion 404 portion of the core 403. When driven in further, the core 403 is pushed in by resisting the thrusting force of the spring 402, and a gap is formed between the core packing 406 and valve main body 301, and hydrogen gas flows out from the hole 405 formed in the core 403, and at the same time the leading end 401 of the push metal 302 abuts against the sheet packing 407 to prevent flow to outside. To the contrary, when detaching the hydrogen occlusion alloy container 2 from the fuel cell side, by loosening the screw of the push metal 302, the leading end 401 of the push metal 302 is separated from the end portion 404 of the core 403, and the core 403 is moved back to the initial position by the thrusting force of the spring 402, so that the core packing 406 closes the hole 405 of the core 403. In this way, the connection portion is provided with an automatic opening and closing mechanism for opening and closing automatically depending on connection and disconnection of the hydrogen occlusion alloy container.

Figure 5:
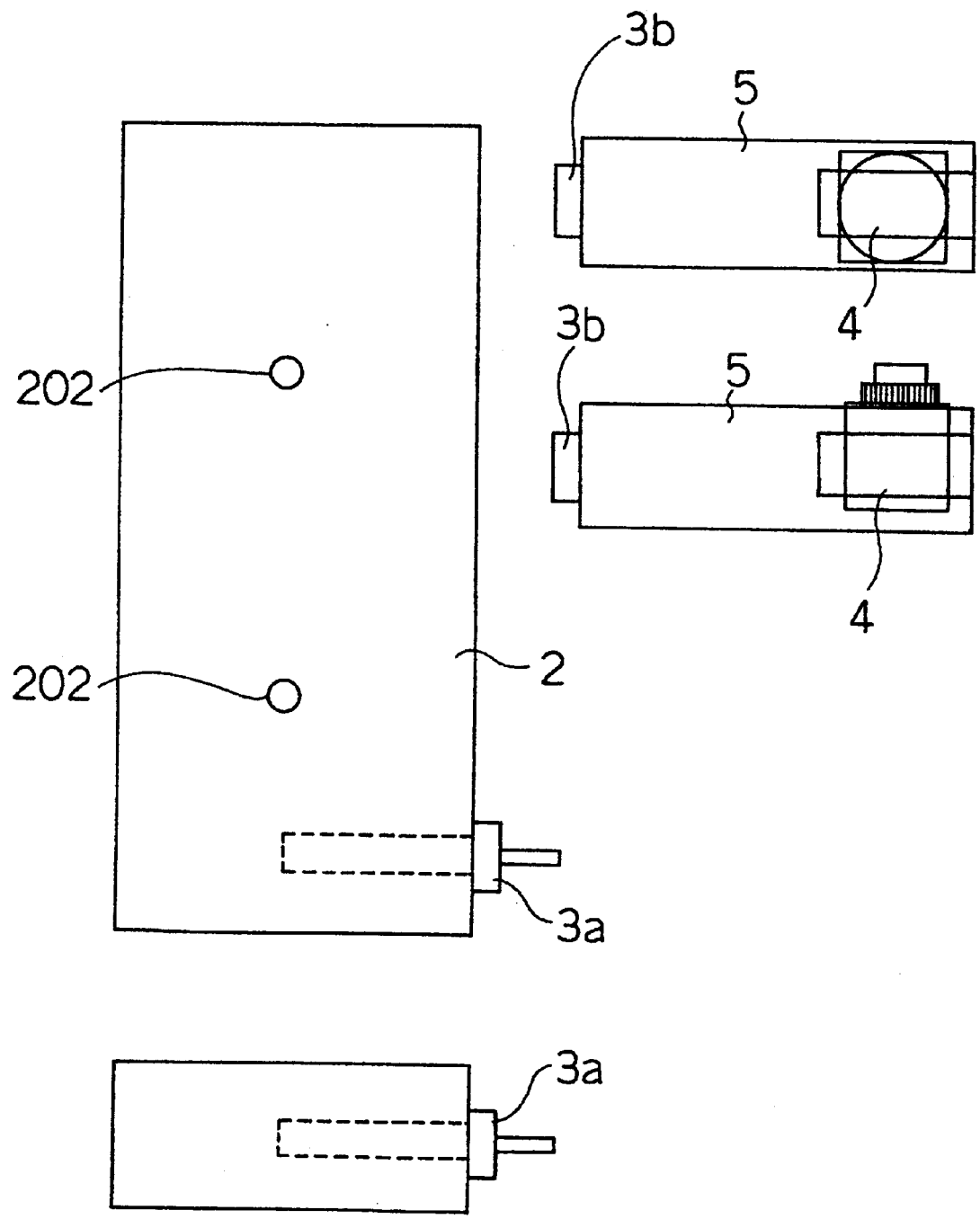
FIG. 5 is a diagram showing a state of the hydrogen occlusion alloy container separated at the connection portion in the same embodiment.
Figure 6:
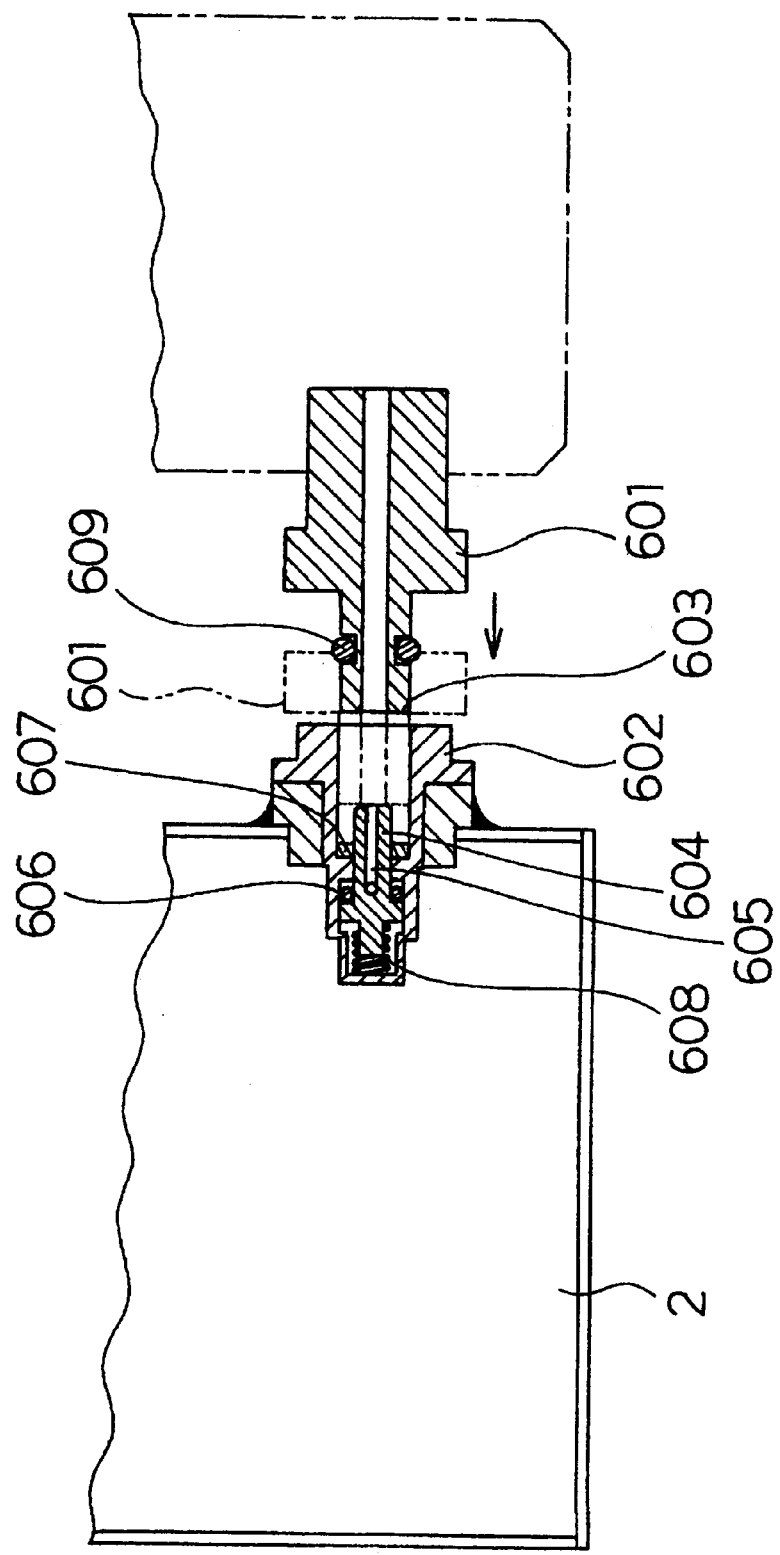
FIG. 6 is a diagram showing a state of the hydrogen occlusion alloy container connected at the connection portion in the same embodiment.

FIG. 5 is a diagram showing an example of using a quick connector, instead of the core valve connector, as the connection portion in the above embodiment, and in the drawings of the hydrogen occlusion alloy container 2 and pressure regulator 5, the upper side shows the plan view and the lower side shows the side view. FIG. 6 is a diagram showing the detail of the quick connector. The basic structure of the quick connector is nearly same as that of the screw-in type of the core valve connector or the like. In FIG. 6, when connecting the hydrogen occlusion alloy container 2 with fuel cell side, a push metal 601 is moved until its leading end 603 hits lightly against a core 604 in a valve main body 602 (in this case, the valve main body 602 side may be used, instead). By a damper (not shown), it is fixed at the position of a stopper 607. By this damper operation, the core 604 is pushed in by resisting the thrusting force of the spring 608, and a gap is formed between the core packing 606 and valve main body 602, and thereby hydrogen gas flows out from a hole 605 formed in the core 604, and at the same time an O-ring 609 of the push metal 601 is pressed against the inner wall of the valve main body 602 to prevent flow to outside. To the contrary, when detaching the hydrogen occlusion alloy container 2 from the fuel cell side, by manipulating the damper in the releasing direction, the core 604 is returned to the initial position by the thrusting force of the spring 608, and the core packing 606 plugs the hole 605 and flow of hydrogen is stopped, so that the valve main body 602 and the push metal 601 may be pulled apart in this state.

In addition, the connecting method of the connection portion includes ratchet type, O-ring type, spring type, ball bearing type, and others. In short, it may be composed to have an automatic opening and closing function for automatically closing the hydrogen inlet and outlet when the hydrogen occlusion alloy container 2 is detached, at the connection portion, and for automatically opening the hydrogen inlet and outlet when the hydrogen occlusion alloy container 2 is attached.

Figure 7:
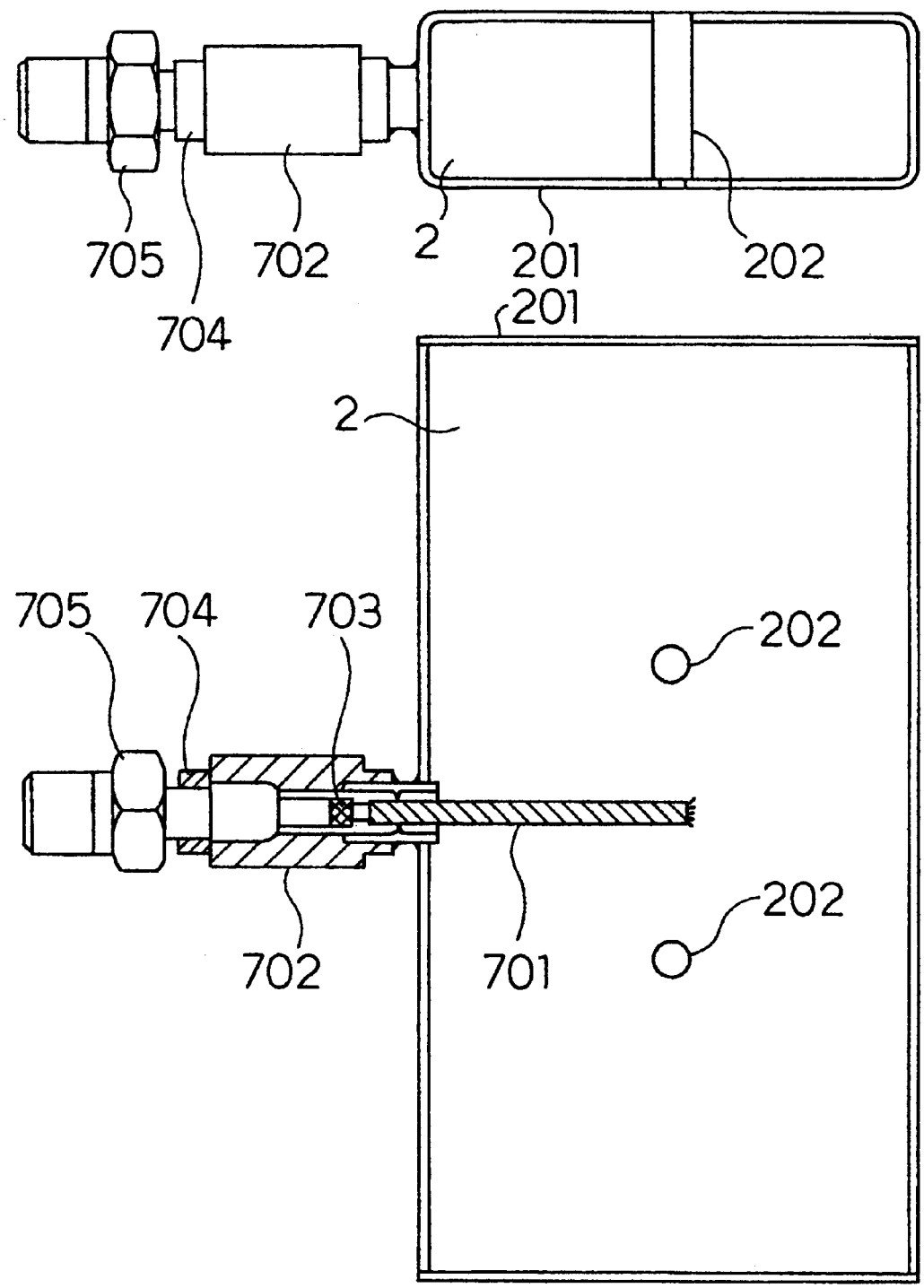
FIG. 7 is a diagram showing the mode of a wick provided in the hydrogen occlusion alloy container in the same embodiment.

FIG. 7 is a diagram showing the wick as a porous element for feeding hydrogen provided inside the hydrogen occlusion alloy container in the embodiment, and the upper drawing is a side view of a partial section, and the lower drawing is a plan view of a partial section. In FIG. 7, the connection portion is composed of a combination of a push joint 705 and a valve 704, and a filter 703 is provided at the end of the valve 704 as alloy powder flow-out preventive mechanism. Further, a wick 701 is provided as a porous element for feeding hydrogen so that hydrogen may flow in and out smoothly, from the filter 703 to the inside of the container main body 201. The principal portion of this filter 703 is made of porous sintered alloy of pore size of about 0.2 to 2 $\mu$m, and, alternatively, this alloy powder flow-out preventive mechanism may be provided inside the container main body 201.

Figure 8:
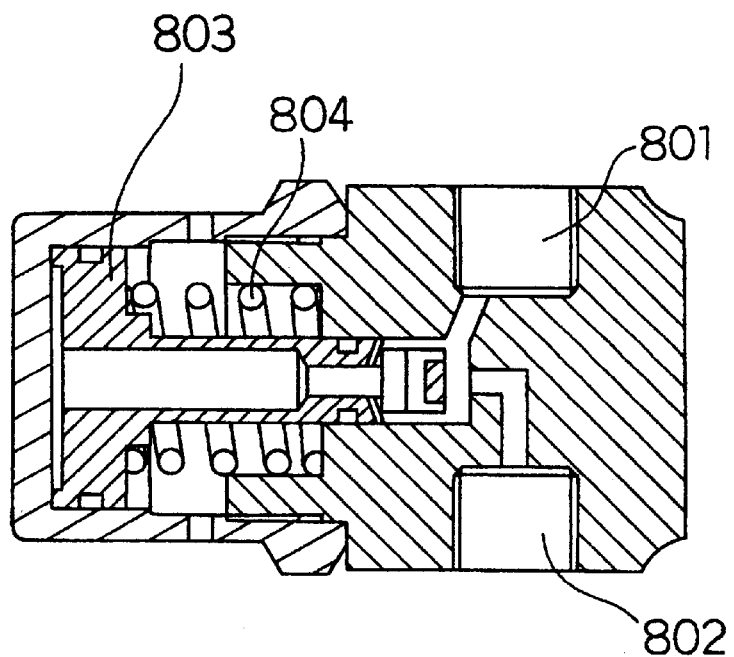
FIG. 8 is a sectional view showing the inside of a hydrogen pressure control mechanism in the same embodiment.

FIG. 8 is a sectional view showing the internal structure of a pressure regulator (for example, 303 in FIG. 3) in the embodiment. This pressure regulator keeps the hydrogen pressure at the outlet 802 side at a constant level lower than at the inlet side 801, in spite of changes of hydrogen pressure at the inlet side 801, by the balance of the displacement of a piston 803 and the thrusting force of a spring 804. Herein, the hydrogen flow-out side pressure of the hydrogen pressure control mechanism is preferred to be atmospheric pressure to 0.4 MPa. The reason is that hydrogen as fuel cannot be supplied into the fuel cell if lower than the atmospheric pressure. If over 0.4 MPa, on the other hand, a pressure-proof structure is required in the fuel cell electrode, which is disadvantageous in both weight and price, and the fuel cell efficiency is lowered. At the same time, fluctuations of hydrogen flow rate are significant, and the electric output fluctuations are hardly stabilized. Hence, this range is appropriate.

Figure 13:
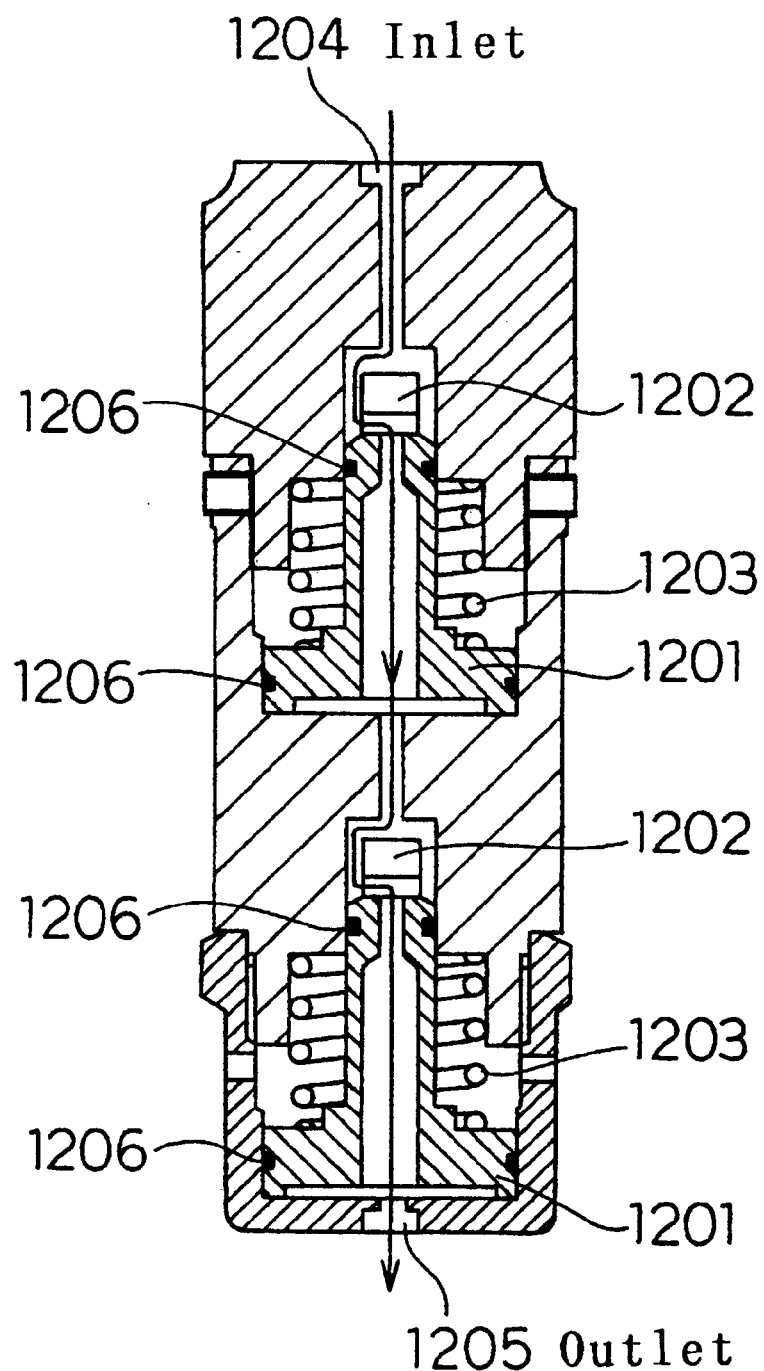
FIG. 13 is a sectional view of piston type two-stage pressure regulator as another example of pressure regulator in the same embodiment.

FIG. 13 shows a piston type two-stage pressure regulator as other example of pressure regulator. In FIG. 13, hydrogen gas flows in from an inlet 1204, and flows out from an outlet 1205, and in this process the pressure regulator operates as follows. When gas flows in by resisting a valve seat 1202 pressed by a spring 1203 of a piston 1201, the gas passes through the inside of the piston 1201, and gets into the piston side of a wider sectional area at the secondary side. As a result, the entire piston 1201 pushes down the valve seat 1202, and functions so that the primary side gas may not flow in. When the gas at the piston side of wider sectional area leaves from the outlet and the pressure drops, the primary side gas pushes again the valve seat 1202 and flows in. As this action is repeated in a very short time, the secondary side pressure is adjusted to a constant level. Herein, balancing of primary pressure and secondary pressure is determined by the strength of the spring 1203, and the ratio of sectional area of the piston 1201. The number of stages to be provided is determined by the difference between the primary pressure and secondary pressure, and the precision of adjustment, and the greater the number of stages, the higher becomes the precision of adjustment of secondary pressure.

Figure 9:
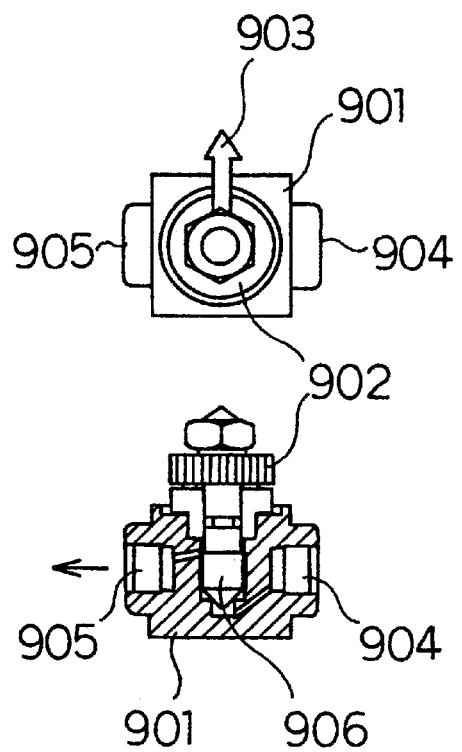
FIG. 9 is a diagram showing a mini valve in the same embodiment.

Next, FIG. 9 is a diagram showing an example of a mini valve (for example, 4 in FIG. 1) as valve mechanism in the embodiment. In this mini valve, by manipulating a handle 902 outside of a valve main body 901, a spindle 906 is rotated, and the path is opened or closed between an inlet 904 and an outlet 905. The opening state of this path is can be monitored by an opening indicator 903.

Figure 14:
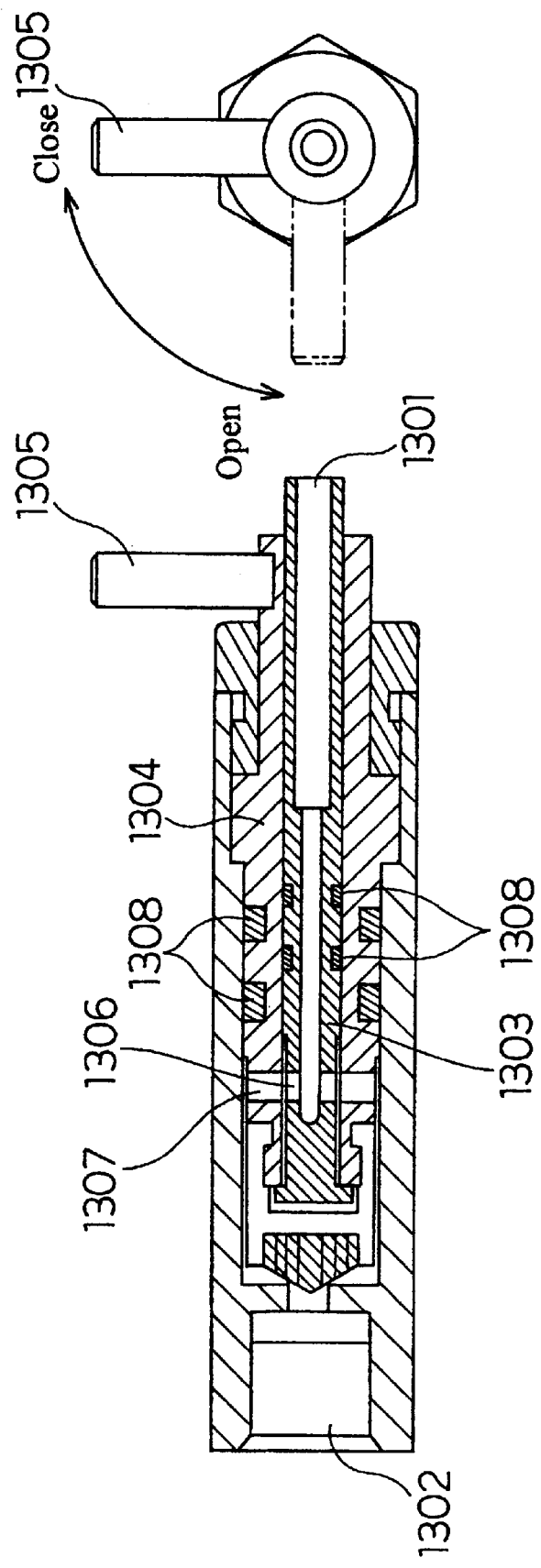
FIG. 14 is a sectional view showing a straight valve as another example of valve mechanism in the same embodiment.

FIG. 14 shows a straight valve as other example of valve mechanism. In FIG. 14, for a fixed stem 1303, an opening stem 1304 is turned by manipulating a lever 1305 as shown in the right drawing. By this manipulation, a hole 1306 of the fixed stem 1303 and a hole 1307 of the opening stem 1304 communicate with each other or are closed, and the gas flows from an inlet 1301 to an outlet 1302 or stops. An O-ring 1308 prevents the gas from flowing out to outside.

Figure 10:
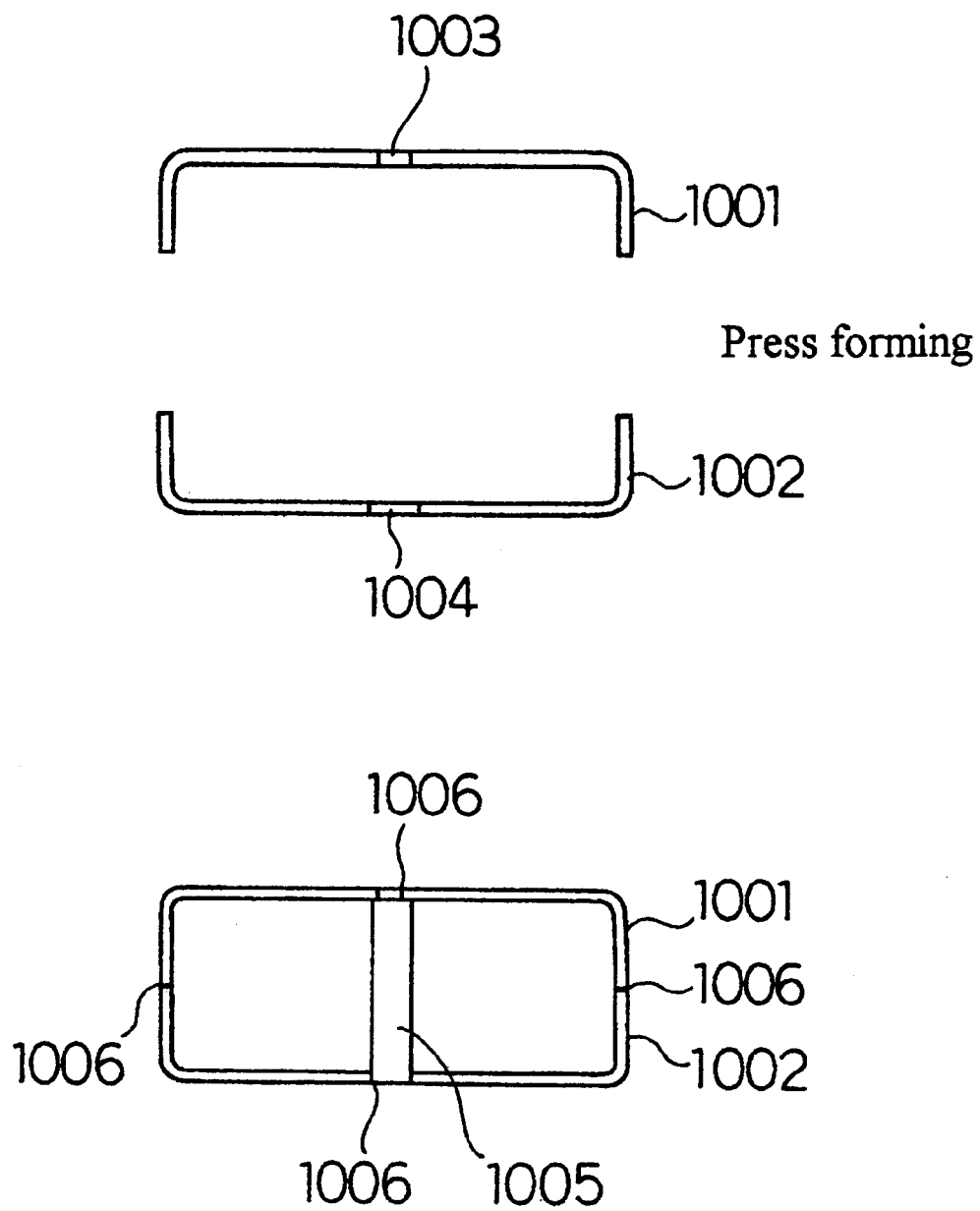
FIG. 10 is an assembly diagram showing a processing method of a stay of the hydrogen occlusion alloy container in the same embodiment.

A manufacturing method of the hydrogen occlusion alloy container in the embodiment is described below. As shown in FIG. 10, a metal plate used for the container main body is cut to desired dimensions, and pressed to form upper and lower pi-shaped members 1001, 1002, and holes are drilled in the position for a stay 1005. The stay 1005 is in a cylindrical form, smaller in diameter at one end than in other parts by the length corresponding to the thickness of the member 1001. A hole 1003 of the member 1001 is in a size for inserting the small end portion of the stay 1005, and a hole 1004 of the other member 1002 is in a size for inserting the large end portion of the stay 1005.

The ends of the two stays 1001, 1002 are put in contact with each other, and the stay 1005 is inserted from the hole 1004, and the small end portion is inserted into the hole 1003. Later, the contact portion 1006 of the members 1001, 1002, and the contact portion 1006 of the holes 1003, 1004 and the stay 1005 are welded, for example, by TIG welding. Thus formed square cylindrical shape with both open ends is further assembled with metal plates cut to the size of the openings by TIG welding, and an enclosed container is completed. The method of forming inlet and outlet of hydrogen as is not explained herein, but as shown in FIG. 2, for example, a fitting hole for a valve mounting seat 203 may be formed, and the valve mounting seat 203 may be inserted, and the contact portion of the member and the valve mounting seat 203 may be welded by TIG welding.

In this embodiment, heat is generated from the fuel cell 1 by reaction, while the hydrogen occlusion alloy container 2 is cooled by absorbing heat when hydrogen gas flows out, but when the hydrogen occlusion alloy is lowered too much in temperature, it no longer releases hydrogen. Accordingly, for heat exchange between the fuel cell 1 and hydrogen occlusion alloy 2, heating plate or heat pipe may be provided between the fuel cell 1 and hydrogen occlusion alloy container 2 so as to contact with both, and the heat generated from the fuel cell 1 may be transmitted to the hydrogen occlusion alloy container 2 so as to heat the hydrogen occlusion alloy container. Or, the fuel cell 1 and hydrogen occlusion alloy container 2 may be stacked up to contact with each other so as to exchange heat mutually. In this case, instead of heat conduction, it may be also designed to heat by direct contact, radiation, or blowing by fan or the like. As the heating plate, instead of the copper plate, an aluminum plate or the like may be also used, and moreover for the ease of dismounting and mounting of the container when exchanging the hydrogen occlusion alloy container 2, the heating plate may be designed to open and close vertically. When using the heat pipe to realize heat exchange function, since the heat pipe can transfer heat even at small temperature gradient, a higher effect is obtained when the hydrogen occlusion alloy container 2 operates at a temperature higher than ordinary temperature, in particular, when operating at nearly same temperature as the fuel cell 1.

As the method of heat exchange, moreover, a piping for heat medium passing through both the fuel cell and the hydrogen occlusion alloy container 2 may be installed in contact, and the piping may be filled with heat medium such as water, fluorine derivative inert liquid (Florinert), silicone oil or the like to circulate by pump or the like. In this case, the circulation speed of the heat medium is set faster when the hydrogen occlusion alloy container 2 operates at a temperature higher than ordinary temperature, and slower when the hydrogen occlusion alloy container 2 operates at a temperature lower than ordinary temperature. By thus adjusting the circulation speed of the heat medium depending on the operating temperature, heat exchange suited to the operating temperature of the hydrogen occlusion alloy container 2 may be realized.

Figure 15:
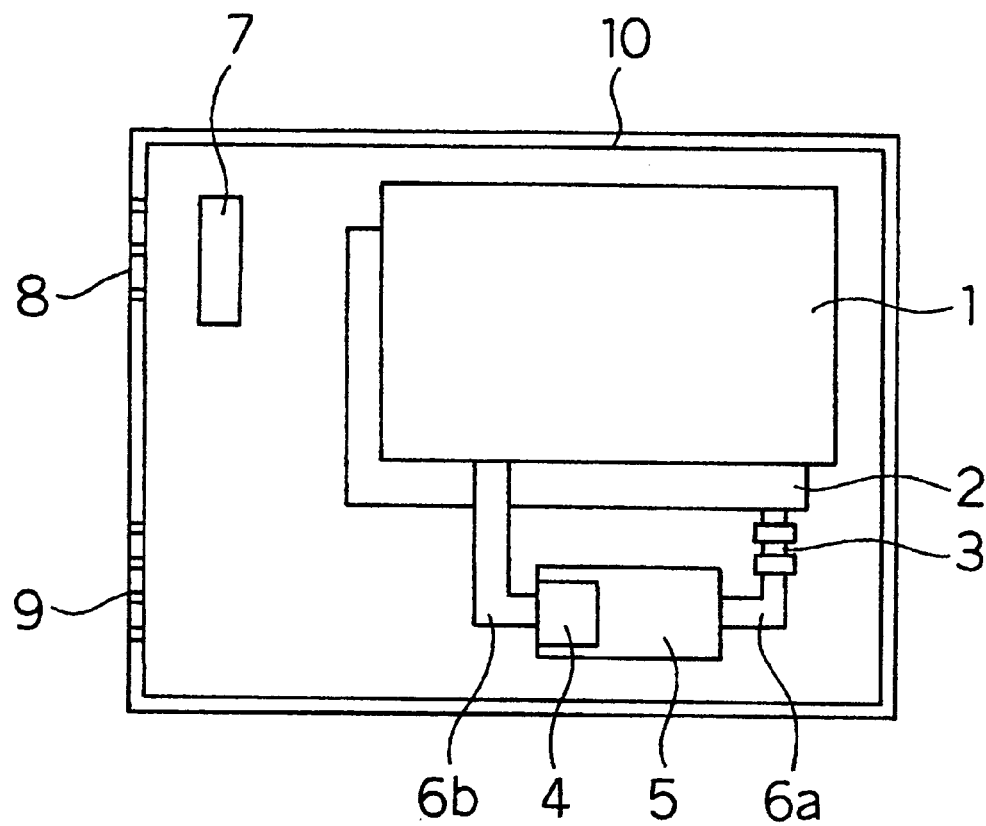
FIG. 15 is a block diagram showing a hydrogen feed system for fuel cell in another embodiment of the invention.

FIG. 15 is a block diagram of a portable battery pack using the fuel cell system of other embodiment of the invention. In FIG. 15, the fuel cell system of the embodiment is composed of a polyelectrolyte type fuel cell main body 1 for generating an electric energy by chemical reaction between hydrogen of fuel and oxygen, a hydrogen occlusion alloy container 2 as a sealing container accommodating hydrogen occlusion alloy for storing hydrogen of fuel, a connection portion 3 fitted to the hydrogen occlusion alloy container 2, a piping 6a connected to the connection portion 3, a pressure regulator 5 as hydrogen pressure control mechanism connected to the piping 6a, a valve mechanism 4 connected to the pressure regulator 5, and a piping 6b connected to the valve mechanism 4, and other end of the piping 6b is connected to the polyelectrolyte type fuel cell main body 1. What this embodiment differs from the embodiment in FIG. 1 is that the fuel cell 1 and hydrogen occlusion alloy container 2 are stacked up vertically to contact with each other, instead of the arrangement on the same plane, and the basic constitution is same as in FIG. 1. In this constitution, mutual heat exchange is realized as mentioned above, and the efficiency of heat exchange is better than in the lateral arrangement as in the preceding embodiment.

Thus, according to the fuel cell system of the embodiment, it is safe from the viewpoint of operating temperature and container pressure, the dead space is small, and hence it is small and compact, it can be used for a longer time (for example, from continuous 3 hours to 5 hours), a high energy density is achieved, it is quicker to respond to load fluctuations than in the phosphate type fuel cell, the operating temperature range is wide (including below 0° C.), and it can be applied to an electrical appliance of any large or small size.

Figure 16A:
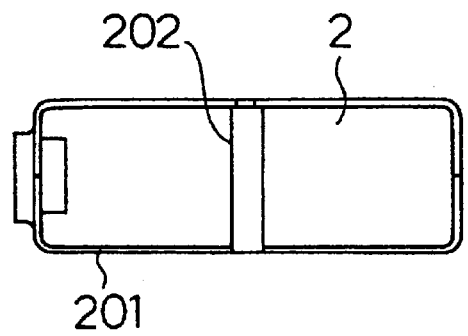
FIG. 16 is a diagram showing a hydrogen occlusion alloy container in a different embodiment of the invention, showing a longitudinal sectional view of the hydrogen occlusion alloy container of the embodiment in (A), and a cross sectional view in (B).
Figure 16B:
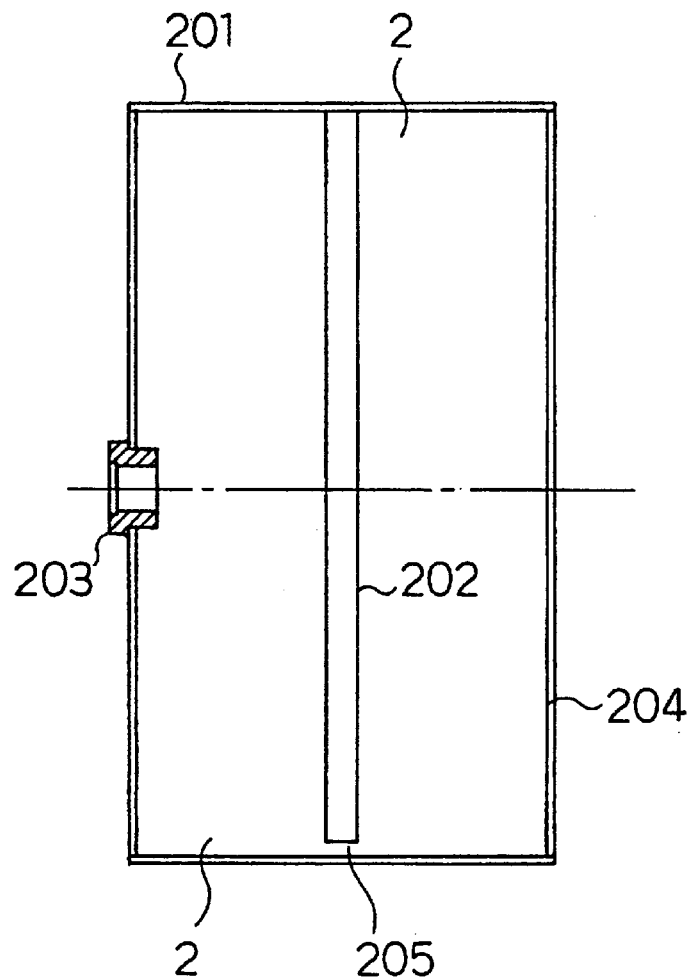

FIGS. 16(*a*) and 16(*b*) are block diagrams of a portable battery pack using a fuel cell system in a different embodiment of the invention. In FIGS. 16(*a*) and 16(*b*), two confronting sides of a rectangular parallelepiped hydrogen occlusion alloy container 2 are supported by a (plate form) stay 202 continuous in the direction of major axis (longer side). In this example, the inside is separated into two chambers. The continuous stay 202 may be an integral structure made of same material as the container wall 204, or may be a different member. The forming method may include excavation cutting process and die casing method, among others. The two separate chambers communicate with each other through a gap between the container wall 204 and stay 202, that is, a hydrogen lead-in hole 205. Of course, three or more chambers may be formed by two or more stays 202. In such a case, the chambers communicate with each other.

Figure 17A:
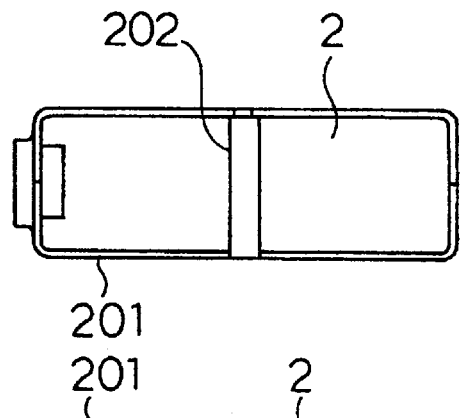
FIG. 17 is a diagram showing a hydrogen occlusion alloy container in a different embodiment of the invention, showing a longitudinal sectional view of the hydrogen occlusion alloy container of the embodiment in (A), and a cross sectional view in (B).
Figure 17B:
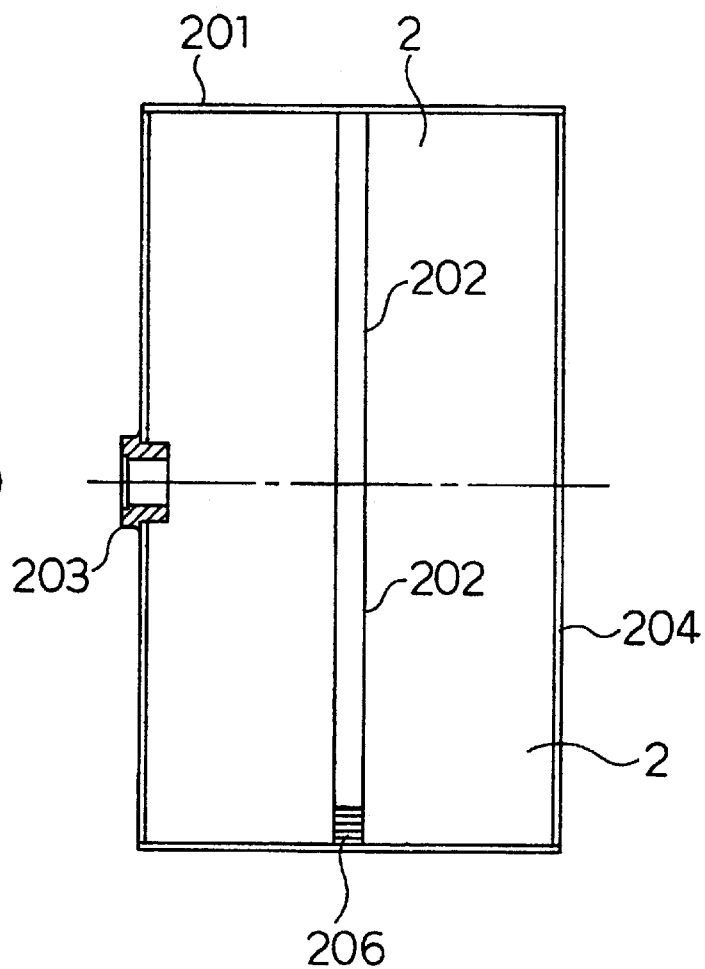

FIGS. 17(*a*) and 17(*b*) are block diagrams of a portable battery pack using a hydrogen feed system for fuel cell in a different embodiment of the invention. In FIG. 17(*b*), the embodiment is a modified form of the preceding embodiment, and a filter 206 for passing only hydrogen is provided in the hydrogen lead-in hole 205. As a result, fluctuations of hydrogen occlusion alloy powder between chambers can be suppressed. When three or more chambers are formed, the filter 206 may be formed in every stay 202, or may be formed only in the stay 202 forming the chamber confronting the inlet and outlet of hydrogen.

Figure 18:
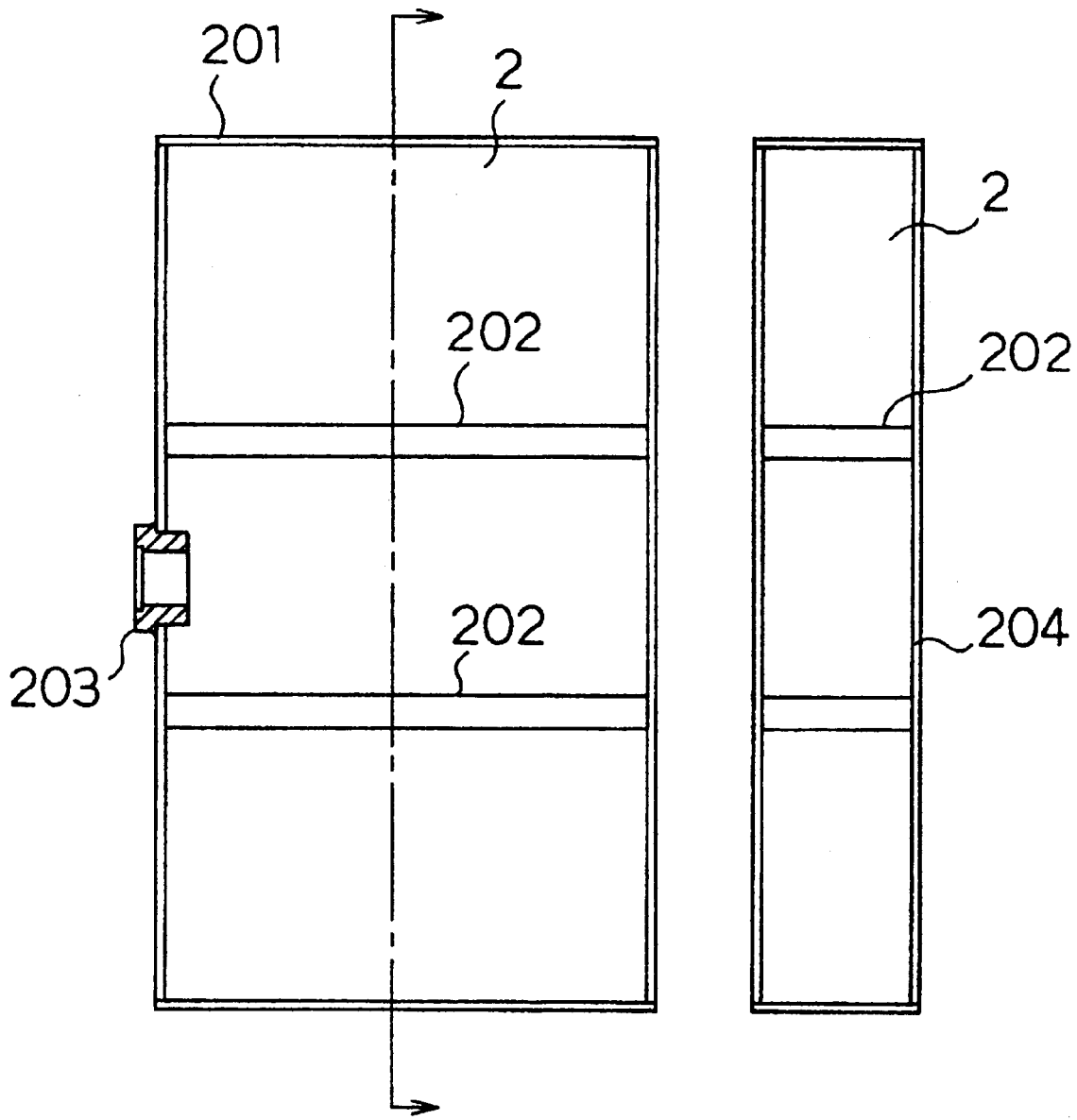
FIG. 18 is a diagram showing a hydrogen occlusion alloy container in a different embodiment of the invention, showing a longitudinal sectional view of the hydrogen occlusion alloy container of the embodiment in (A), and a cross sectional view in (B).

FIGS. 18(*a*) and 18(*b*) are block diagrams of a portable battery pack using a hydrogen feed system for fuel cell in a different embodiment of the invention. In the embodiment shown in FIGS. 18(*a*) and 18(*b*), two confronting sides of a rectangular parallelepiped hydrogen occlusion alloy container 2 are supported by a (plate form) stay 202 continuous in the direction of minor axis (shorter side). In this example, the inside is separated into three chambers. In this embodiment, instead of forming a gap, a sintered alloy filter is used in each stay 202 so as to lead in hydrogen gas at least in part. Alternatively, by disposing a mesh excellent in thermal conductivity made of copper, aluminum or the like in each chamber, the generated heat can be transmitted smoothly.

Therefore, since the fuel cell system of the invention is wide in application range, it is ideal as the power source for portable electric appliances in which smaller size and longer time of operation are more and more demanded, in particular, portable electronic appliances represented by laptop computers. The heat generated by the fuel cell 1 is absorbed by the endothermic reaction when the hydrogen occlusion alloy releases hydrogen, and extra waste heat discharged outside is decreased, and therefore when used as a built-in power supply for various electric appliances, adverse thermal effects on the electric appliances can be prevented.

As a portable electric appliance of other embodiment of the invention using a portable battery pack incorporating the fuel cell system described above as the power source, an example of laptop computer is described below. When using the fuel cell as the power source for laptop computer, especially as a battery pack of built-in power source, the following points are required same as in the conventional secondary battery such as nickel and hydrogen storage battery.

(a) Exhaust gas should be clean. Using hydrogen gas fuel, electricity is generated by reaction between hydrogen and oxygen, and hence the reaction product is water only, not releasing harmful gas such as $CO_2$ and $No_x$.

(b) Handling should be easy. Using a polymer electrolyte fuel cell (PEFC), it does not require high temperature as in phosphate type fuel cell, and it can be used at ordinary temperature. Mounting an automatic control device, only by pressing a start button (which may be interlocked with power switch of computer), the subsequent operation is fully automatic. That is, handling is same as that of ordinary secondary battery.

(c) Free from noise. The fuel cell itself does not cause noise because power is generated by chemical reactions but noise is caused by a fan used for sending oxygen into the fuel cell. This problem may be practically solved by using a low-noise type fan.

(d) Safety. Hydrogen is stored in the hydrogen occlusion alloy, and the operating pressure can be kept low, and safety is high.

(e) Compact size. The shape of the hydrogen occlusion alloy container is rectangular parallelepiped, and it is almost free from dead space unlike the conventional cylindrical form, and the space can be utilized effectively. Besides, as compared with the conventional secondary battery, the operating time is longer.

(f) Usable repeatedly. Since the hydrogen occlusion alloy container can be easily detached or attached at the connection portion, it may be replaced with a spare hydrogen occlusion alloy container occluding hydrogen, or an empty hydrogen occlusion alloy container may be refilled with hydrogen.

(g) Excellent electrical characteristics. The fuel cell itself causes voltage fluctuations and time-course changes due to load fluctuations same as in other battery, but the voltage can be stabilized by using DC/DC converter or the like.

Hence, by fabricating a portable battery pack incorporating fuel cell system formed in the same size and shape as the conventional battery pack using secondary battery such as nickel and hydrogen storage battery, it is sufficiently usable as the built-in power source for an ordinary laptop computer.

In the foregoing embodiments, the hydrogen pressure control mechanism by pressure regulator is provided in the hydrogen passage, but instead, for example, a hydrogen flow rate control mechanism by a method of adjusting the orifice size may be installed. Or, both hydrogen pressure control mechanism and hydrogen flow rate control mechanism may be provided.

In the above embodiments, the stay as the support member is a round bar, but not limited to this, for example, the surface may be provided with undulations, fins or other shape for increasing the surface area, and heat exchange function may be provided.

In the embodiments, the inner surface and outer surface of the sealing container is composed of a flat metal plate, but, not limited to this, the inner surface or outer surface, or both surfaces may be provided with undulations or the like to enhance the heat exchange function and mechanical strength. Or, to enhance the heat exchange function, fins may be formed on the inner surface or outer surface, or on both surfaces.

In the embodiments, as the sealing method in the connection portion, mainly O-ring is used, but not limited to this, general packings may be also used. In this case, in the O-ring or packing position, a groove may be formed, or a flat surface may be applied.

In the embodiments, the O-ring forming side is cylindrical, but it may be also a conical side.

In the embodiments, the laptop computer is the example of portable electric appliances, but not limited to this, for example, it may be applied in television, hand-held lamp, radio, and other electric appliances. In this case, it may be used either as built-in power source or separate power source. When used as separate power source, the size limitation of the entire hydrogen feed system for fuel cell is alleviated, and a larger capacity is realized, and the size can be reduced from the conventional fuel cell system, as the power source for outdoor photographic illumination or construction works, emergency power source, or power generator for outdoor life.

As clear from the description herein, the invention comprises a rectangular parallelepiped sealing container for accommodating hydrogen occlusion alloy for occluding hydrogen to be supplied to a fuel cell, a connection portion provided in a hydrogen passage between the sealing container and the fuel cell for connecting the sealing container and fuel cell detachably, a valve mechanism provided in the hydrogen passage for opening and shutting hydrogen gas, and a hydrogen flow rate control mechanism provided in the hydrogen passage for controlling the flow rate of hydrogen gas and/or hydrogen pressure control mechanism for controlling the pressure of hydrogen gas, and therefore it can be used for a longer time, and can be reduced in size and weight.

Other embodiment of the invention is described below while referring to the drawing.

Figure 19:
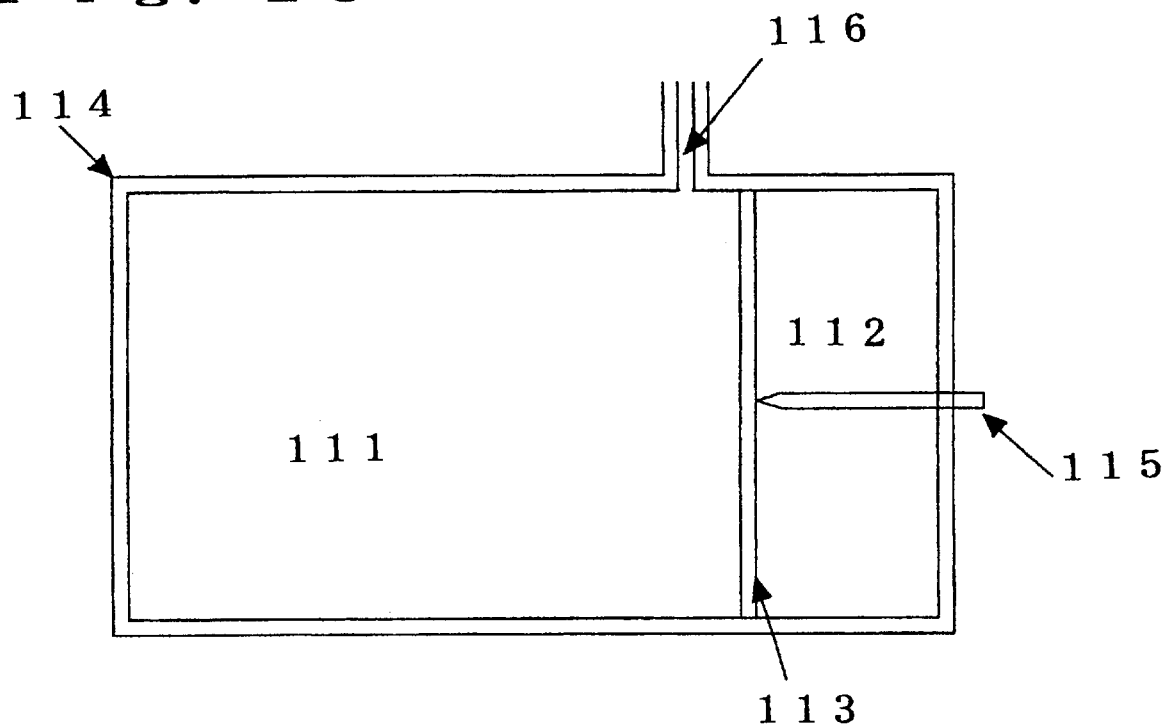
FIG. 19 is a block diagram of a sealing container for feeding fuel into fuel cell, used in a fuel feed system for fuel cell in an embodiment of the invention.

FIG. 19 is a block diagram of a sealing container (corresponding to container 2 in FIG. 1) for feeding fuel to the fuel cell, relating to a constitution of a portable battery pack using a fuel feed system for fuel cell in an embodiment of the invention.

A metal hydride was used as a substance 111 for generating hydrogen by reaction with water. The metal hydride was a hydride of Ti-Mn system hydrogen occlusion alloy. This metal hydride 111 and water 112 were charged into a stainless steel sealing container 114 through a partition 113, and a sealing container 2 incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen. Reference numeral 116 is a fuel feed port.

In this constitution, after start of operation of the fuel cell by manipulation of the switch 115, an output of 10 W of the fuel cell could be obtained for 8 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by LiH was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 10 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by $LiBH_4$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 8 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by $B_e(BH_4)_2$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 7 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by $K_2B_2H_6$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 7 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by $Al(BH_4)_3$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 7.5 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by $B_2H_6$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 8 hours continuously.

FIG. 19 is a block diagram of a sealing container for feeding fuel to the fuel cell, in the constitution of a portable battery pack using a fuel feed system for fuel cell in a different embodiment of the invention. What differs from the embodiment shown in FIG. 1 is the substance 111 for generating hydrogen by reaction with water.

As the substance 111 for generating hydrogen by reacting with water, a hydride as presented by HCOONa was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

In this constitution, after start of operation of the fuel cell by manipulation of the switch 115, an output of 10 W of the fuel cell could be obtained for 7hours continuously.

Figure 20:
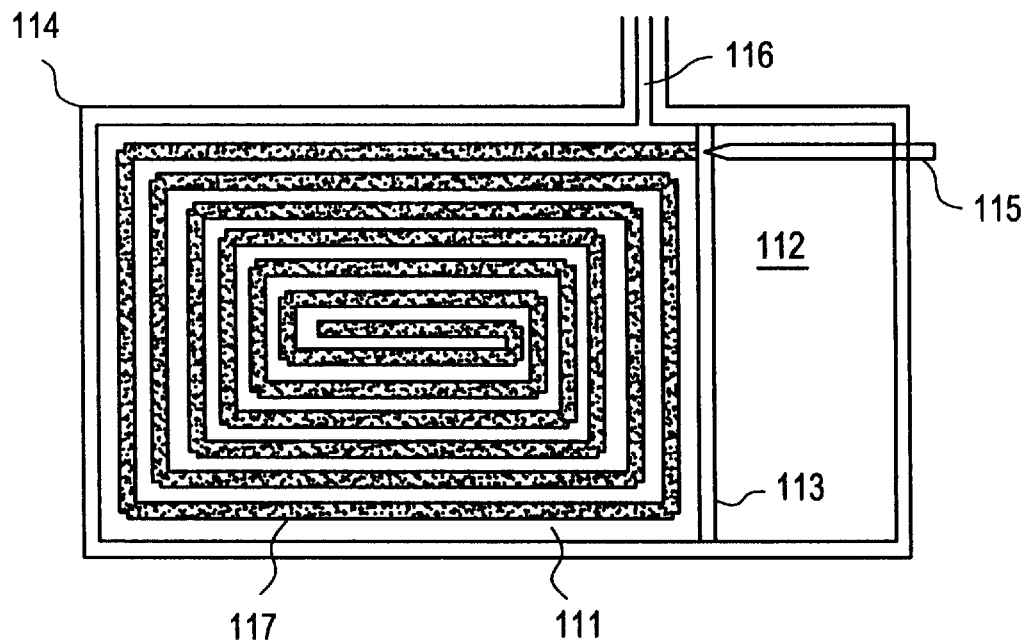
FIG. 20 is a block diagram of a sealing container for feeding fuel into fuel cell, used in a fuel feed system for fuel cell in another embodiment of the invention.

FIG. 20 is a block diagram of a sealing container for feeding fuel to the fuel cell, in the constitution of a portable battery pack using a fuel feed system for fuel cell in a different embodiment of the invention.

As the substance 111 for generating hydrogen by reacting with water, a hydride as presented by LiAlH$_4$ was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen.

Besides, from the hole opened by the switch 115, for example, water is absorbed into a hydrophilic nonwoven cloth 117, and being transmitted through the hydrophilic nonwoven cloth 117, it uniformly reacts with the substance 111 for generating hydrogen by reacting with water, so that the substance 111 for generating hydrogen by reacting with water contained in the stainless steel sealing container 114 can be completely reacted efficiently. In this constitution, after start of operation of the fuel cell by manipulation of the switch 115, an output of 10 W of the fuel cell could be obtained for 9 hours continuously.

Figure 21:
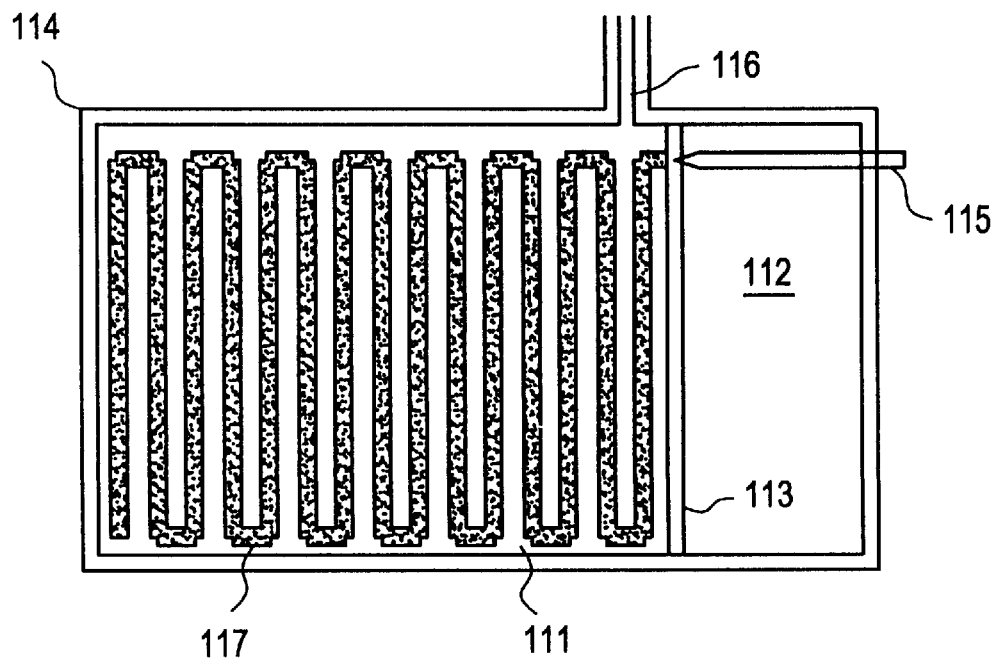
FIG. 21 is a block diagram of a sealing container for feeding fuel into fuel cell, used in a fuel feed system for fuel cell in a different embodiment of the invention.

FIG. 21 is a block diagram of a sealing container for feeding fuel to the fuel cell, in the constitution of a portable battery pack using a fuel feed system for fuel cell in a different embodiment of the invention.

As the substance 111 for generating hydrogen by reacting with water, a hydride as presented by FeO was used. This metal hydride 111 and water 112 were charged into a stainless steel sealing container 114 through a partition 113, and a sealing container incorporating the substance for generating hydrogen for feeding fuel to the fuel cell was prepared. Herein, the partition 113 preliminarily isolates the metal hydride 111 and water 112, and when operating the fuel cell 1, a tiny hole is formed in the partition 113 by a switch 115, and the metal hydride 111 and water 112 react with each other to generate hydrogen. Besides, from the hole opened by the switch 115, for example, water is absorbed into a hydrophilic nonwoven cloth 117, and being transmitted through the hydrophilic nonwoven cloth 117, it uniformly reacts with the substance 111 for generating hydrogen by reacting with water, so that the substance 111 for generating hydrogen by reacting with water contained in the stainless steel sealing container 114 can be completely reacted efficiently.

In this constitution, after start of operation of the fuel cell by manipulation of the switch 115, an output of 10 W of the fuel cell could be obtained for 10 hours continuously.

Incidentally, this FeO reacts with water to generate hydrogen, and is at the same time oxidized to be. Fe$_3$O$_4$, but it was reusable by regenerating by reducing process.

FIG. 19 is a block diagram of a sealing container for feeding fuel to the fuel cell, in the constitution of a portable battery pack using a fuel feed system for fuel cell in a different embodiment of the invention.

As the substance 111 for generating hydrogen by reacting with acidic aqueous solution, aluminum was used. This substance 111 generating hydrogen by reacting with acidic aqueous solution and the acidic aqueous solution 112 were charged into a stainless steel sealing container 114 through a partition 113, and a sealing container incorporating the substance for generating hydrogen for feeding fuel to the fuel cell was prepared. Herein, the partition 113 preliminarily isolates the substance 111 generating hydrogen by reacting with acidic aqueous solution and the acidic aqueous solution 112, and when operating the fuel cell 1, a tiny hole is formed in the partition 113 by a switch 115, and the substance 111 generating hydrogen by reacting with acidic aqueous solution and the acidic aqueous solution 112 react with each other to generate hydrogen.

In this constitution, after start of operation of the fuel cell by manipulation of the switch 115, an output of 10 W of the fuel cell could be obtained for 8 hours continuously.

FIG. 19 is a block diagram of a sealing container for feeding fuel to the fuel cell, in the constitution of a portable battery pack using a fuel feed system for fuel cell in a different embodiment of the invention.

As the substance 111 for generating hydrogen by reacting with acidic aqueous solution, iron was used. This substance 111 generating hydrogen by reacting with acidic aqueous solution and the acidic aqueous solution 112 were charged into a stainless steel sealing container 114 through a partition 113, and a sealing container incorporating the substance for generating hydrogen for feeding fuel to the fuel cell was prepared. Herein, the partition 113 preliminarily isolates the substance 111 generating hydrogen by reacting with acidic aqueous solution and the acidic aqueous solution 112, and when operating the fuel cell 1, a tiny hole is formed in the partition 113 by a switch 115, and the substance 111 generating hydrogen by reacting with acidic aqueous solution and the acidic aqueous solution 112 react with each other to generate hydrogen.

In this constitution, after start of operation of the fuel cell by manipulation of the switch 115, an output of 10 W of the fuel cell could be obtained for 7 hours continuously.

FIG. 19 is a block diagram of a sealing container for feeding fuel to the fuel cell, in the constitution of a portable battery pack using a fuel feed system for fuel cell in a different embodiment of the invention.

As the substance 111 for generating hydrogen by reacting with acidic aqueous solution, zinc was used. This substance 111 generating hydrogen by reacting with acidic aqueous solution and the acidic aqueous solution 112 were charged into a stainless steel sealing container 114 through a partition 113, and a sealing container incorporating the substance for generating hydrogen for feeding fuel to the fuel cell was prepared. Herein, the partition 113 preliminarily isolates the substance 111 generating hydrogen by reacting with acidic aqueous solution and the acidic aqueous solution 112, and when operating the fuel cell 1, a tiny hole is formed in the partition 113 by a switch 115, and the substance 111 generating hydrogen by reacting with acidic aqueous solution and the acidic aqueous solution 112 react with each other to generate hydrogen.

In this constitution, after start of operation of the fuel cell by manipulation of the switch 115, an output of 10 W of the fuel cell could be obtained for 7 hours continuously.

In the foregoing embodiments, the material for composing a sealing container for feeding fuel to the fuel cell was stainless steel, but it may be also composed of copper, aluminum, plastics, glass fiber and other compound material, glass, or other materials. Besides, the layout pattern of the hydrophilic nonwoven cloth shown in FIG. 20, FIG. 21, and others may be also other layout pattern. Instead of the hydrophilic nonwoven cloth, any other cloth than nonwoven cloth may be used as far as it is a hydrophilic sheet material.

As clear from the description herein, the invention explained by reference to FIGS. 19 to 21 can present a fuel feed system for fuel cell that can realize a small-sized and lightweight power source usable for a long time.

This fuel feed system for fuel cell is capable to be applied to a portable electric appliance as mentioned in embodiments of FIG. 1 to FIG. 18.

Next the portable electric appliance using the fuel cell system of FIG. 1 to FIG. 18 and the portable electric appliance using the fuel cell system of FIG. 19 to FIG. 21 are further concretely described.

Figure 23:
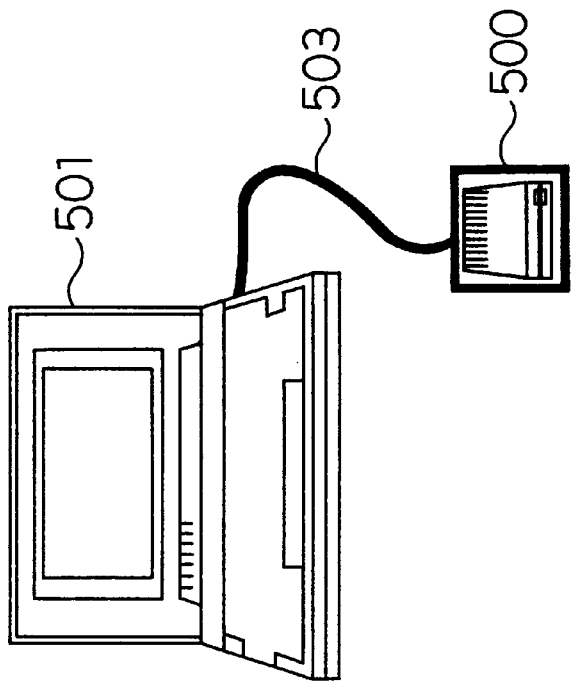
FIG. 23 is a block diagram of a mechanical constitution of a portable electric appliance in another embodiment of the invention.
Figure 22:
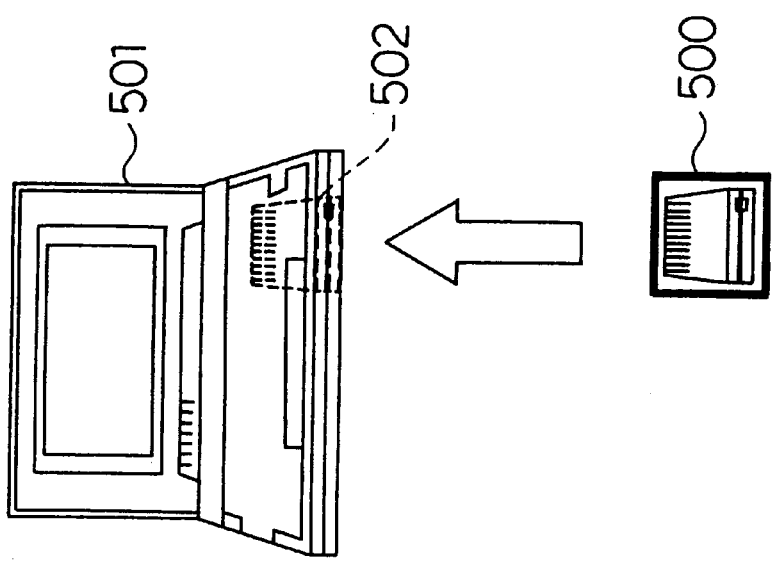
FIG. 22 is a block diagram of a mechanical constitution of a portable electric appliance in an embodiment of the invention.
Figure 24:
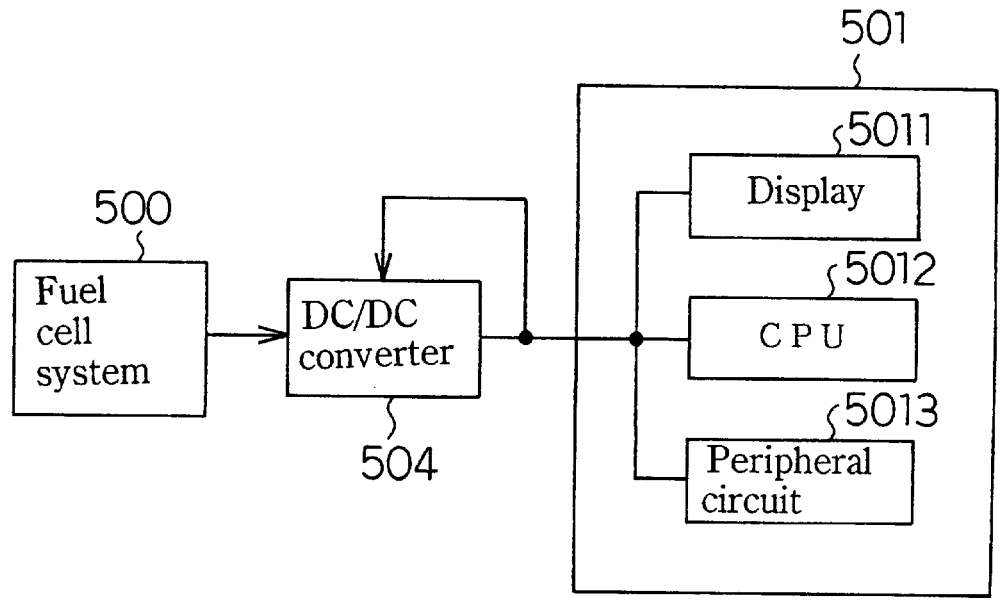
FIG. 24 is a block diagram of an electric constitution of a portable electric appliance in embodiments of the FIG. 23 and FIG. 24.

FIG. 22 shows a note type personal computer selected as the portable electric appliance. That is the fuel cell system 500 or a fuel cell system 500 including the fuel feed system for fuel cell is detachably set into a chamber 502 of the note type personal computer 501. FIG. 23 shows that those fuel cell system 500 and the note type personal computer are connected by an electric wire 503. FIG. 24 shows an electric constitution for the FIG. 22 or FIG. 23 and the fuel cell system 500 and the note type personal computer 501 are connected via a DC/DC converter 504. The power from the fuel cell system 500 fluctuates within 10V to 15V. The DC/DC 504 converter controls the fluctuation within 6 V±10% to supply it to the note type personal computer. Meanwhile the note type personal computer 501 includes a display 5011, CPU 5012, peripheral circuit 5013 and so on.

Figure 25:
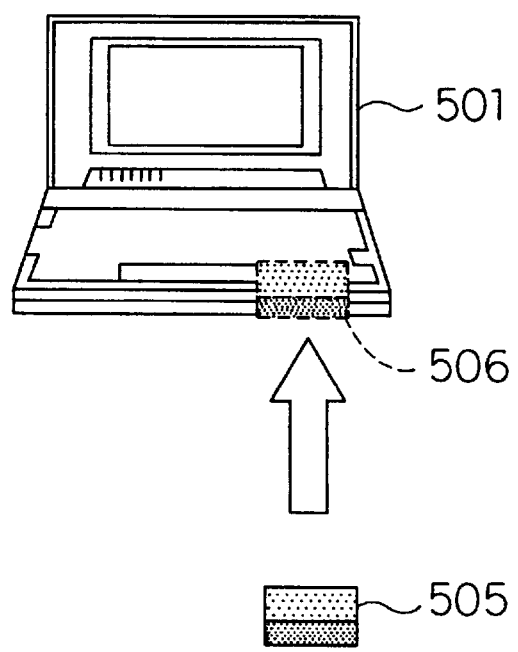
FIG. 25 is a block diagram of a mechanical constitution of a portable electric appliance in another embodiment of the invention.

FIG. 25 shows an embodiment wherein only a container 505 which is rectangular parallelepiped containing hydrogen occlusion alloy and is capable of being sealed, which is described in FIG. 1 to FIG. 18, is detachably set into the note type personal computer 501, or wherein only a fuel feed system for fuel cell 505. which is described in FIG. 19 to FIG. 21, is detachably set into the note type personal computer 501. The 506 designates the chamber into which the container 505 is set. Then the fuel cell itself is installed within the note type personal computer 501.

What is claimed is:

1. A fuel cell system for generating electric power, comprising:
    a fuel cell of a solid polymer;
    a rectangular parallelepiped sealing container for accommodating hydrogen occlusion alloy, for occluding hydrogen to be supplied to said fuel cell, said sealing container having an inner surface, an outer surface, a plurality of sides, and at least two confronting sides having having surfaces with the largest area;
    a connection portion provided in a hydrogen passage between said sealing container and said fuel cell for detachably connecting said sealing container and said fuel cell;
    a valve mechanism provided in said hydrogen passage for opening and shutting a flow of hydrogen gas; and
    a flow control mechanism provided in said hydrogen passage for controlling a flow rate of hydrogen gas, said mechanism chosen from the group consisting of a hydrogen pressure control mechanism and a hydrogen flow rate control mechanism.

2. The fuel cell system defined in claim 1, wherein the sealing container has at least one support member for supporting two sides of said sealing container, said member provided between two confronting sides having the largest surface area.

3. The fuel cell system defined in claim 2, wherein said support member has a shape so as to increase a surface area in order to have a heat exchange function.

4. The fuel cell system defined in claim 2, wherein the support member comprises a plate.

5. The fuel cell system defined in claim 1, wherein said valve mechanism and said flow control mechanism are provided at said fuel cell side of said connection portion.

6. The fuel cell system defined in claim 1, wherein undulations or fins are present on the outer surface and the inner surface of said sealing container.

7. The fuel cell system defined in claim 1, wherein a heat exchange mechanism is provided in order to heat said sealing container by making use of heat generated from the fuel cell.

8. The fuel cell system defined in claim 1, wherein an alloy powder flow-out preventive mechanism for preventing hydrogen occlusion alloy from flowing out of said sealing container is provided inside said sealing container.

9. The fuel cell system defined in claim 1, wherein an alloy powder flow-out preventive mechanism for preventing hydrogen occlusion alloy from flowing out of said sealing container is provided in said hydrogen passage between said sealing container and said connection portion.

10. The fuel cell system defined in claim 1, wherein a porous element for hydrogen lead-in, communicating with said hydrogen passage, is provided in said sealing container.

11. The fuel cell system defined in claim 1, wherein a hydrogen equilibrium pressure, when releasing hydrogen occlusion alloy, is 11 MPa or less at 35° C.

12. The fuel cell system defined in claim 1, wherein the valve mechanism has an automatic opening and closing mechanism for opening when connecting at the connection portion, and closing when dismounting at the connection portion.

13. The fuel cell system defined in claim 12, wherein the connection portion incorporates said valve mechanism.

14. The fuel cell system defined in claim 12, wherein the valve mechanism is comprised of a push-in valve.

15. The fuel cell system defined in claim 1, wherein a hydrogen flow-out side pressure of the flow control mechanism is in a range of between atmospheric pressure and 0.4 Mpa.

16. A portable electric appliance, wherein the power source of the appliance comprises the fuel cell system of claim 1.

17. The portable electric appliance defined in claim 16, wherein a container, which is rectangular parallelepiped, which contains hydrogen occlusion alloy, and which is capable of being sealed, is detachably set into a main body of the portable electric appliance.

18. A fuel feed system for a fuel cell, comprising:
    a sealing container for feeding fuel to a polyelectrolyte fuel cell, and
    a fuel passage between said sealing container and said polyelectrolyte fuel cell,
    wherein said sealing container further comprises
        a first chamber containing water,
        a second chamber containing a substance for generating hydrogen by reacting with water, and
        isolation means for isolating said first chamber containing water from said second chamber containing a substance for generating hydrogen by reacting with water,
    wherein said isolation means further comprises
        switch means for opening a hole in said isolating means and feeding hydrogen into said polyelectrolyte fuel cell, in order to generate hydrogen by inducing reaction, by adding water to the substance for generating hydrogen by reaction with water when operating said polyelectrolyte fuel cell.

19. The fuel feed system defined in claim 18, wherein the substance for generating hydrogen by reacting with water is a hydride.

20. The fuel feed system defined in claim 18, wherein the substance for generating hydrogen by reacting with water is a boron hydride.

21. The fuel feed system defined in claim 18, wherein the substance for generating hydrogen by reacting with water is at least one substance selected from the group consisting of $BH_3$, $B_3H_6$, $B_4H_{10}$, $B_5H_9$, $B_5H_{11}$, $B_6H_{10}$, and $B_{10}H_{14}$.

22. The fuel feed system defined in claim 18, wherein the substance for generating hydrogen by reacting with water is a boron lithium hydride.

23. The fuel feed system defined in claim 18, wherein the substance for generating hydrogen by reacting with water is MxByHz, wherein M is an alkaline metal, B is boron, H is hydrogen, x is an integer from 1 to 10, y is an integer from 1 to 20, and z is an integer from 1 to 30.

24. The fuel feed system defined in claim 18, wherein the substance for generating hydrogen by reacting with water is a boron aluminum hydride.

25. The fuel feed system defined in claim 18, wherein the substance for generating hydrogen by reacting with water is FeO.

26. The fuel feed system defined in claim 18, wherein a hydrophilic nonwoven cloth is placed in said chamber containing said substance for generating hydrogen by reacting with water or acidic aqueous solution.

27. A portable electric appliance, wherein the power source of the appliance comprises a fuel cell having the fuel feed system as defined in claim 18.

28. The portable electric appliance defined in claim 27, wherein a container of said fuel feed system for a fuel cell is detachably set into a main body of the portable electric appliance.

29. A fuel feed system for a fuel cell, comprising:

a sealing container for feeding fuel to a polyelectrolyte fuel cell, and a fuel passage between said sealing container and said polyelectrolyte fuel cell, wherein said sealing container further comprises a first chamber containing an acidic aqueous solution, a second chamber containing a substance for generating hydrogen by reacting with acidic aqueous solution, and isolation means for isolating said first chamber containing acidic aqueous solution from said second chamber containing a substance for generating hydrogen by reacting with acidic aqueous solution, said isolation means further comprising switch means, for opening a hole in said isolating means and feeding hydrogen into said polyelectrolyte fuel cell, in order to generate hydrogen by inducing reaction by adding acidic aqueous solution to the substance for generating hydrogen by reaction with acidic aqueous solution when operating said polyelectrolyte fuel cell.

* * * * *